(12) United States Patent
Kaku

(10) Patent No.: US 6,697,568 B1
(45) Date of Patent: Feb. 24, 2004

(54) MOTION IMAGE RECORDING APPARATUS AND DIGITAL CAMERA

(75) Inventor: Junya Kaku, Itami (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/498,648

(22) Filed: Feb. 7, 2000

(30) Foreign Application Priority Data

| Feb. 8, 1999 | (JP) | 11-030507 |
| Feb. 17, 1999 | (JP) | 11-038044 |

(51) Int. Cl.[7] .............................................. H04N 5/225
(52) U.S. Cl. ........................ 386/117; 386/120; 386/124; 348/231.99
(58) Field of Search ............................ 386/117, 46, 124, 386/125, 126, 121, 120; 348/220.1, 231.99, 231.1, 231.4, 231.7, 231.9; 358/906, 909.1; H04N 5/225

(56) References Cited

U.S. PATENT DOCUMENTS

| 5,153,730 A | * 10/1992 | Nagasaki et al. ......... 348/231.6 |
| 5,619,260 A | * 4/1997 | Miyadera ................. 348/223.1 |
| 5,754,227 A | * 5/1998 | Fukuoka .................. 348/231.6 |
| 5,875,280 A | 2/1999 | Takaiwa et al. |
| 5,903,309 A | * 5/1999 | Anderson ............... 348/333.02 |
| 5,905,528 A | * 5/1999 | Kodama .................. 348/220.1 |
| 5,949,950 A | * 9/1999 | Kubo ......................... 386/46 |
| 6,118,480 A | * 9/2000 | Anderson et al. ....... 348/207.99 |

FOREIGN PATENT DOCUMENTS

| JP | 6-90423 | 3/1994 |
| JP | 8-79687 | 3/1996 |
| JP | 8-163478 | 6/1996 |
| JP | 9-181954 | 7/1997 |
| JP | 9-331501 | 12/1997 |
| WO | WO 96/26600 | 8/1996 |
| WO | WO 98/48572 | 10/1998 |

OTHER PUBLICATIONS

Japanese Office Action dated Nov. 12, 2002.

* cited by examiner

Primary Examiner—Vincent Boccio
(74) Attorney, Agent, or Firm—Armstrong, Kratz, Quintos, Hanson & Brooks, LLP

(57) ABSTRACT

A motion image recording apparatus includes a shutter button. When the shutter button is pressed, still image data in frames due to picture taking is subjected to compression by a JPEG CODEC. The compressed image data is written to an SDRAM that operates as a ring buffer. The compressed image data is read out of the SDRAM concurrently with such writing, and then recorded onto a memory card. As a result, long-time motion images are recorded on the memory card. However, the read rate from the SDRAM is slower than the write rate onto the SDRAM. Accordingly, the writing is suspended when a write position approaches a read position and they becomes a predetermined relationship.

17 Claims, 34 Drawing Sheets

| MAIL NO. | READ START ADDRESS | SIZE ( byte ) |
|---|---|---|
| 0 | ---------------- | ————— |
| 1 | ---------------- | ————— |
| 2 | ---------------- | ————— |
| 3 | ---------------- | ————— |
| ⋮ | ⋮ | ⋮ |
| L − 3 | ---------------- | ————— |
| L − 2 | ---------------- | ————— |
| L − 1 | ---------------- | ————— |

| 0 | 0 | 1 | 0 |
|---|---|---|---|

BIT 0 1 2 3

KEY HALF PRESS FULL PRESS CAMERA REPRODUCE

| MAIL NO. | READ START ADDRESS | SIZE (BYTE) |
|---|---|---|
| 0 | ---------------- | ----- |
| 1 | ---------------- | ----- |
| 2 | ---------------- | ----- |
| 3 | ---------------- | ----- |
| ⋮ | ⋮ | ⋮ |
| L-3 | ---------------- | ----- |
| L-2 | ---------------- | ----- |
| L-1 | ---------------- | ----- |

MOTION IMAGE RECORDING APPARATUS AND DIGITAL CAMERA

BACKGROUND OF THE INVENTION

1. Field of the Invention

This invention relates to motion image recording apparatus and, more particularly, to a motion image recording apparatus applicable to a digital camera which records a plurality of frames of image data onto a recording medium according to a recording instruction.

The invention is also concerned with digital cameras and, more particularly, with a digital camera for taking a picture of a subject according to a picture taking instruction and recording a taken image signal onto a recording medium.

2. Description of the Prior Art

In the conventional digital cameras, when a motion image recording mode is selected, a picture-taking process and compression process of motion image data are commenced responsive to an operation of a shutter release button. The compressed motion image data thus produced is temporarily stored into an internal memory. If the shutter button is thereafter put off, the picture-taking and compression processes are suspended and the compressed motion image data stored in the internal memory is then recorded collectively onto a recording medium. Meanwhile, when a still picture recording mode is selected, a one-frame picture taking process and compressing process of taken still image data are performed responsive to a shutter button operation. The compressed still image data thus produced is recorded onto the recording medium through the internal memory.

In the prior arts, however, in the case that the motion image recording mode is selected, compressed motion image data has to be once stored in the internal memory before recorded to the recording medium. This leads to a problem that a continuously recording time period is dependent upon an internal memory capacity. Also, even where the still image recording mode is selected, the processes of picture taking, compression and recording are conducted in a serial order fashion. Another problem lies in the prior arts, i.e. the interval of shutter button operations, or picture-taking time interval, increases particularly when successive shots are carried out.

SUMMARY OF THE INVENTION

It is therefore a primary object of the present invention to provide a motion image recording apparatus which is capable of recording motion images for a long time, in a manner regardless of its memory capacity.

Another object of the invention is to provide a digital camera which can shorten the picture-taking time interval.

In accordance with the present invention, a motion image recording apparatus for recording a plurality of successive frames of image data onto a recording medium in response to a recording instruction, comprises: an image writer for cyclically writing the image data to an internal memory; an image reader for cyclically reading out of the internal memory the image data to be recorded to the recording medium; and a disabler for disabling the image writer when an image write position and an image read position are in a predetermined relationship.

When a plurality of frames of successive image data are recorded onto a recording medium in response to a recording instruction, the image data is first written to the internal memory in a cyclical fashion. The image data written on the internal memory is read out by the image reader in a cyclical fashion and written to the recording medium. Accordingly, where the internal memory is small in capacity, a long time of motion images can be recorded to the recording medium. However, when an image write position and an image read position are in a predetermined relationship, the image writer is disabled by the disabler. As a result, there is no possibility that the unread image data be overwritten by the succeeding image data.

In one aspect of the invention, the internal memory has a plurality of image blocks, and each of the image block having a corresponding capacity to a predetermined number of frames of image data.

In one embodiment of the invention, the image writer preferably includes a selector and a image data writer. The selector cyclically selects the image blocks one by one, and an image data writer writes the predetermined number of frames of image data to a selected one of the image blocks by the selector.

In another embodiment of the invention, a plurality of block flags respectively correspond to the plurality of image blocks. A setter sets corresponding one of the block flags to the image block to which writing of the predetermined number of frames of image data has been completed. A resetter resets corresponding one of the block flags to the image block from which reading out of the predetermined number of frames of image data has been completed.

Here, the image reader includes an image data reader to read the image data by predetermined bytes at one time out of one of the image blocks, and a renewer to renew a read address each time reading out by the predetermined bytes has been completed; and the resetter including a detector to detect the read address, a determiner to determine a completion of reading out of the image block based on a result of detection by the detector, and a flag resetter to reset the block flag depending upon a result of determination by the determiner.

Also, the disabler disables the image writer depending upon a state of the block flag.

In another aspect of the invention, a compressor compresses the plurality of frames of image data. In this case, the image writer writes compressed image data having been compressed by the compressor to the internal memory, and the image reader reading the compressed image data out of the internal memory.

In still another aspect of the invention, a picture taking circuit takes a picture of a subject and produce the plurality of frames of image data.

In yet another aspect of the invention, a sound writer cyclically writes sound data related to the image data into the internal memory. Thereafter, a sound reader cyclically reads from the internal memory the sound data to be recorded onto the recording medium.

In accordance with the present invention, a digital camera, comprises: an input key for inputting a shooting instruction; an image sensor for shooting a subject; and a multitask CPU for concurrently performing, based on the shooting instruction, a write process to write a corresponding still image signal to the subject into an internal memory and a recording process to record the still image signal stored in the internal memory onto the recording medium.

A shooting instruction is inputted by the input key, and a subject is shot by the image sensor. When a shooting instruction is inputted, the multitask CPU performs concurrently a process of writing a still image signal obtained based on the shooting instruction into the internal memory, and a process of recording the still image signal written on the internal memory to the recording medium. This reduces the time interval of taking pictures particularly when conducting successive shots.

In one aspect of the invention, the write process includes a first determining process, an image write process and a preparation process. Here, the first determining process is to determine a presence or absence of the shooting instruction. The image write process is to write the still image signal into the internal memory when determined as a presence of the shooting instruction. The preparation process is to prepare an administration table for administrating address information of the still image signal stored in the internal memory. On the other hand, the recording process including an image read process and an image recording process. The image recording process is to read the still image signal out of the internal memory based on the administration table, while an image recording process is to record the still image signal read out by the image read process onto the recording medium.

In one embodiment of the invention, the write process further includes an estimation process and a first disable process. The estimation process is to estimate based on the administration table a signal amount of the still image signal written in the internal memory but not yet recorded. The first disable process is to disable the first determination process for a predetermined time period depending upon a result of estimation by the estimation process.

The estimation process preferably includes a first comparison process to compare the signal amount with a first predetermined value, and a second comparison process to compare the signal amount with a second predetermined value greater than the first predetermined value. The first disable process preferably includes a first suspension process to suspend the first determination process until a predetermined timing signal has been generated when the signal amount exceeds the first predetermined value, and a second suspension process to suspend the first determination process until the recording process has been ended when the signal amount exceeds the second predetermined value.

In another embodiment of the invention, the input key is a key to input the shooting instruction and a shooting preparation instruction, and the shooting preparation instruction being to be inputted when the input key is shifted to a first operation state, and the shooting instruction being to be inputted when the input key is shifted to a second operation state through the first state.

Here, the write process preferably includes a second determination process, a shooting preparation process and a second disable process. The second determination process is to determine a presence or absence of the shooting preparation instruction. The shooting preparation process is to prepare for shooting the subject when determined as a presence of the shooting preparation instruction. The second disable process is to disable the second determination process depending upon a time difference between a determination in a last time of a presence of the shooting instruction and a determination in a present time of a presence of the shooting instruction.

The shooting preparation process preferably includes an adjustment process on a shooting condition and a detection process to detect a successive shotable number.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is an illustrative view showing an instruction list applied to the FIG. 1 embodiment;

FIG. 19 is an illustrative view showing a register provided in a system controller applied in the FIG. 17 embodiment;

FIG. 20 is an illustrative view showing an instruction list applied in the FIG. 17 embodiment;

DETAILED DESCRIPTION OF THE PREFERRED EMBODIMENTS

Figure 1:
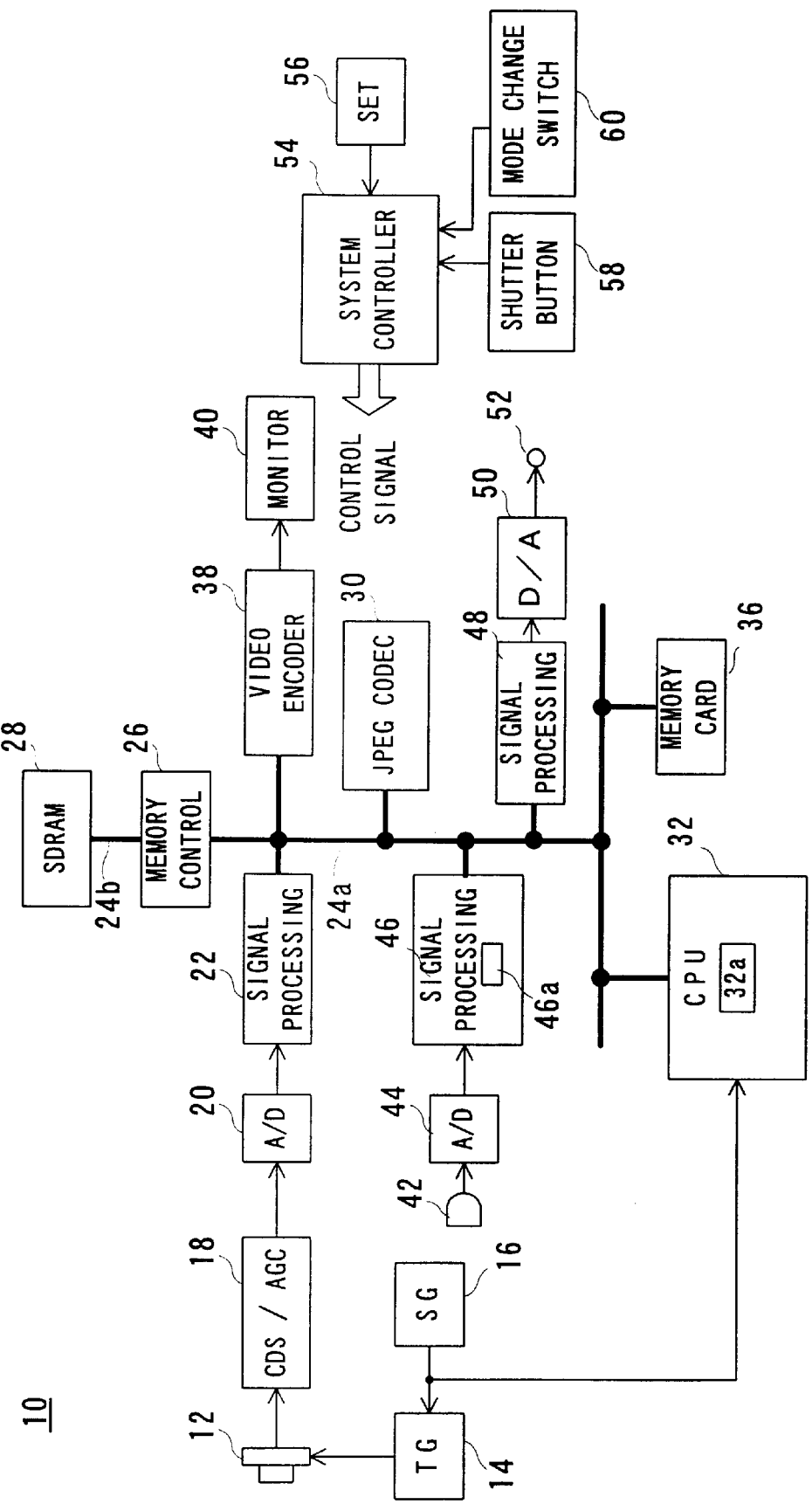
FIG. 1 is a block diagram showing one embodiment of the present invention.

Referring to FIG. 1, a digital camera of this embodiment includes a CCD imager 12. The CCD imager 12 has a color filter (not shown) arranged at the front thereof. An optical image of a subject is taken through a color filter to the CCD imager 12.

If a mode change switch 60 is switched to "CAMERA" side, a system controller 54 sets for a camera mode. A timing generator (TG) 14 produces a timing signal based on a vertical synchronizing signal and horizontal synchronizing signal outputted from the signal generator (SG) 16, thereby driving the CCD imager 12 according to a thinning-out scheme. As a result, low-resolution camera signals in frames are outputted from the CCD imager 12 at an interval of 1/15th of a second. The output camera signals are subjected to well-known noise removal and level adjustment by a CDS/AGC circuit 18, and then converted into camera data as a digital signal by an A/D converter 16. A signal processing circuit 22 performs YUV conversion on the camera data outputted from the A/D converter 20 to thereby produce YUV data. Because the CCD imager 12 outputs camera signals in frames at an interval of 1/15th of a second, the YUV data (still image data) in frames is also outputted every 1/15th of a second. The signal processing circuit 22 outputs still image data thus created, together with a write request, to a memory control circuit 26.

Figure 3:
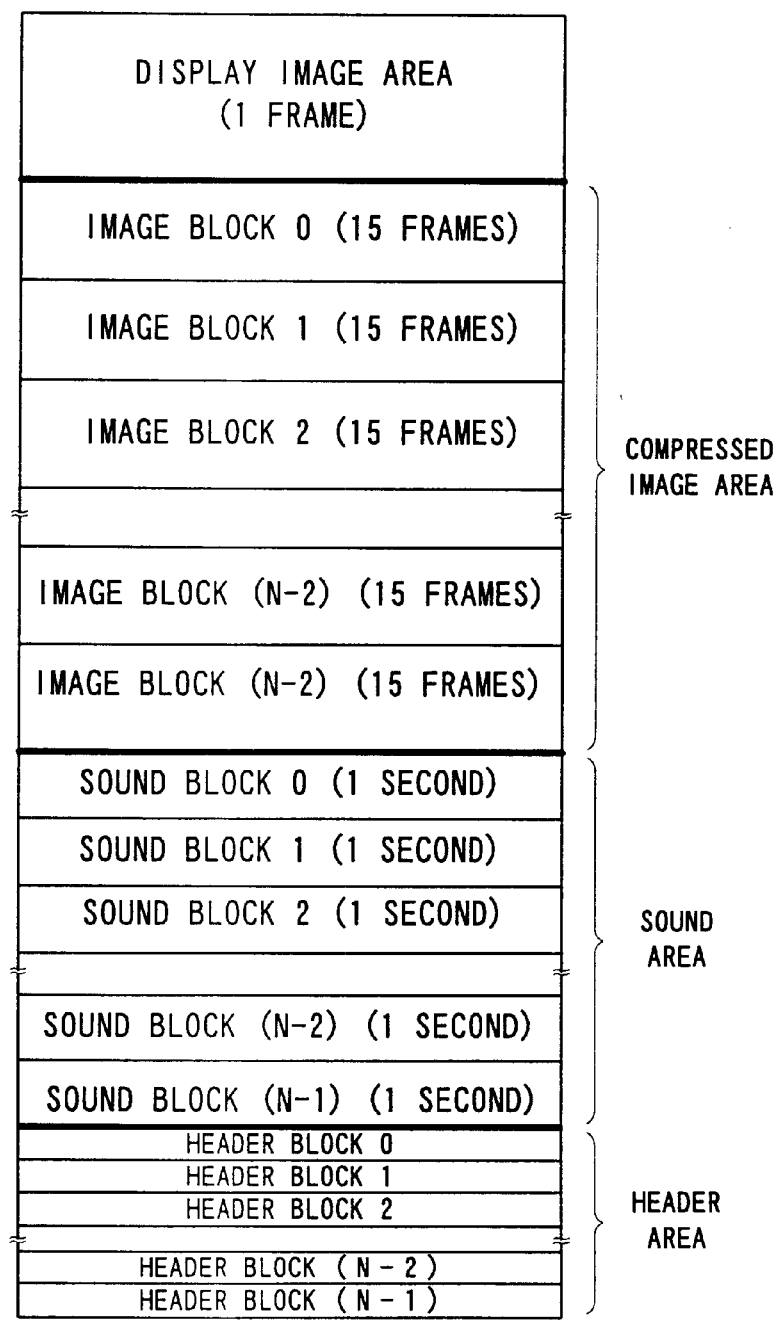
FIG. 3 is an illustrative view showing an SDRAM applied to the FIG. 1 embodiment.

The memory control circuit 26 writes the still image data onto an SDRAM 28 in response to the write request. The SDRAM 28 has a display image area formed as shown in FIG. 3 on which the still image data is written. Because the display image area has a capacity of only 1 frame, the one-frame still image data thereon is renewed every 1/15th of a second. Meanwhile, a video encoder 38 outputs request signals at an interval of 1/15th of a second and the memory control circuit 26, in turn, reads still image data out of the display image area at an interval of 1/15th of a second. The read-out still image data in frame is supplied via a bus 24a to the video encoder 38.

The video encoder 38 produces an NTSC-formatted composite image signal from the input still image data, and delivers composite image signal thus produced to a monitor 40. As a result, subject motion images are displayed real-time on the monitor 40.

If an operator presses a shutter button 58, the system controller 54 instructs a CPU 32 to record a motion image and sound. Thereupon, the CPU 32 generates image compressing and sound processing commands at an interval of 1/15th of a second. The image compression command is supplied to a JPEG CODEC 30 while the sound processing command is sent to a signal processing circuit 46.

The JPEG CODEC 30 outputs a read request to the memory control circuit 26 in response to the image compressing command. Due to this, the still image data stored in the display image area of the SDRAM 28 is read out at an interval of 1/15th of a second by the memory control circuit 26. The read-out still image data is sent via a bus 24a to the JPEG CODEC 30 where it is subjected to JPEG compression. Each time obtaining 1 frame of compressed image data, the JPEG CODEC 30 requests the memory control circuit 26 to write the compressed image data. In response, the memory control circuit 26 writes the frames of compressed image data to the compression image area shown in FIG. 3. The compression image area has a plurality of image blocks each of which can afford to store 15 frames of compressed image data. The compressed image data is written by 15 frames onto each compressed image block.

On the other hand, the signal processing circuit 46 fetches sound data from an A/D converter 44 in response to the sound processing command. That is, fetched is sound data having been caught by a microphone 42 and subjected to A/D conversion. The fetched sound data is subjected to a predetermined process and the processed sound data is outputted, together with a write request, to the memory control circuit 26. Because the sound processing commands are given every 1/15th of a second, sound data in an amount of 1/15th of a second, or of 524 bytes, is outputted to the memory control circuit 46. The memory control circuit 26 writes the 524-bytes sound data onto a sound area shown in FIG. 3, in response to the write request. The sound area has sound blocks each of which can store 1 second (7866 bytes) of sound data. The sound data is written in an amount of 1 second a time onto each block.

Each time 15 frames of compressed image data and 1 second of sound data have been written to the SDRAM 28, the CPU 32 creates image header data and sound header data and requests the memory control circuit 26 to write these of the header data. The memory control circuit 26 writes the image and sound header data to header blocks formed in the header area shown in FIG. 3. Note that the image header and sound header data in a mutual relationship are written to same-numbered header blocks. As a result of such writing process, the compressed image data, sound data and header data in a corresponding relationship to each other are written to a same-numbered image block, sound block and header block.

The CPU 32 also requests the memory control circuit 26 to read out data. In response to a read request, the memory control circuit 26 reads a sound header, sound, image header and an image in this order out of same-numbered blocks. At first, sound header data is read out of a header block, and 1-second sound data is read out of a sound block. Next, an image header data is read out of a header block, and 15 frames of compressed image data is read out of an image block. The CPU 32 records the read-out data onto a memory card 36. Incidentally, the memory card 36 is an unloadable recording medium, which in a loaded state is connected to the bus 24a through a not-shown interface.

Figure 2:
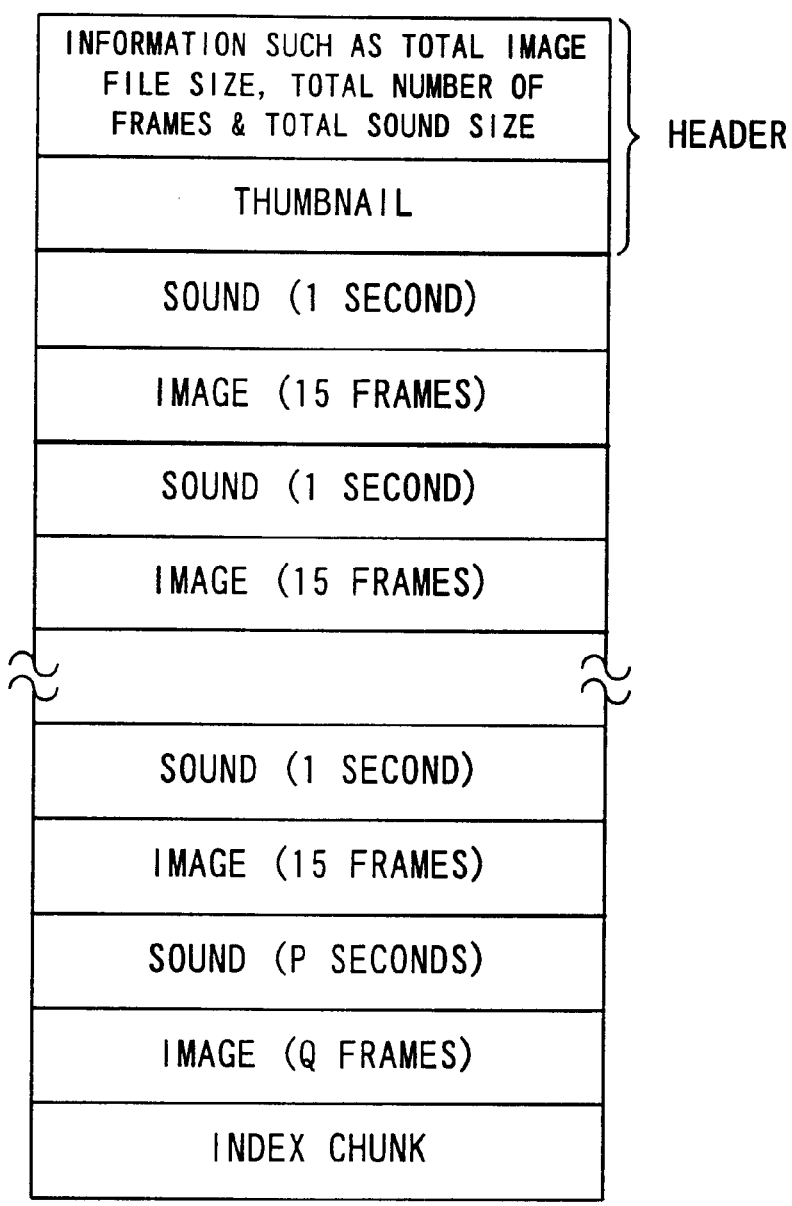
FIG. 2 is an illustrative view showing an AVI file applied to the FIG. 1 embodiment.

Within the memory card 36, a header for an AVI (Audio Video Interleave) file is newly created in response to a first operation of a shutter button 58, and the data read out of the SDRAM 28 is written to a position following the file header. This results in alternate formation, as shown in FIG. 2, of a sound chunk formed by 1 second of sound data and an image chunk formed by 15 frames of compressed image data. Sound header data is provided at a head of the sound chunk while image header data is at a head of the image chunk. Note that in this embodiment 1 second of motion image is formed by 15 frames, and one sound chunk and the following one image chunk are in a corresponding relationship to each other.

If the shutter button 58 is turned off, the CPU 32 suspends the outputs of image compression commands to the JPEG CODEC 30 and of the sound processing commands to the signal processing circuit 46. That is, data is suspended from being written to the SDRAM 28. Meanwhile, the recording process will be ended when the data of the SDRAM 28 has been all recorded to the memory card 36.

Referring to FIG. 3, when data writing to block (N−1) is completed by a write process, block 0 is taken as a next write destination. Also, when reading from block (N−1) is completed by a record process, block 0 is taken as a next read destination. That is, the SDRAM 28 serves as a ring buffer so that the write block and read block are renewed in a ring form, or cyclically, throughout each of the compressed image area, the sound area and the header area. However, the data write rate to the SDRAM 28 is not the same as the data read rate from the SDRAM 28. The data write rate is rather faster than the data read rate. For this reason, when the write block catches up with the read block, the write mode is forcibly suspended even in a state the shutter button 58 is positioned on. That is, suspended are an image compression command from being outputted to the JPEG CODEC 30 and for a sound processing command from being outputted to the signal processing circuit 46. Therefore, there is no possibility that the unread data be overwritten by the succeeding data. The recording process will be ended at a time that all the data of the SDRAM 28 has been recorded onto the memory card 36.

Incidentally, the video encoder 38, even while the shutter button 58 is being pressed, generates read requests at an interval of 1/15th of a second, and the memory control circuit 28 in turn reads frames of still image data out of the display image area. Due to this, on the monitor 40 are displayed same motion images as those recorded to the memory card 46. When the shutter button 58 is turned off or otherwise the write block catches up with the read block thereby forcibly suspending the write mode, the CCD imager 12 is disabled until the record process has been completed. Due to this, the still image at a time of suspension is kept displayed on the monitor for a certain time period.

Figure 5:
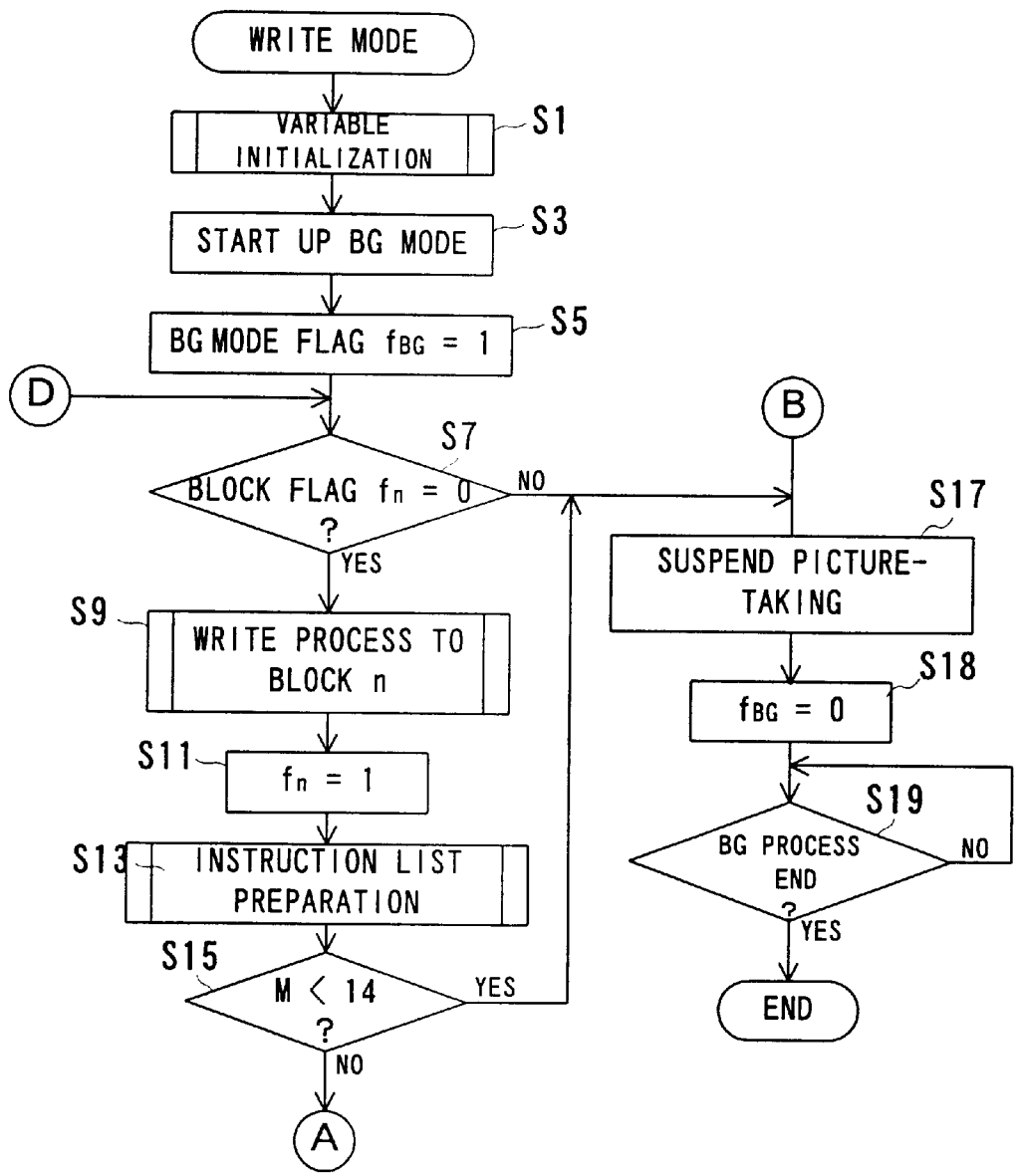
FIG. 5 is a flowchart showing part of operation of the FIG. 1 embodiment.
Figure 6:
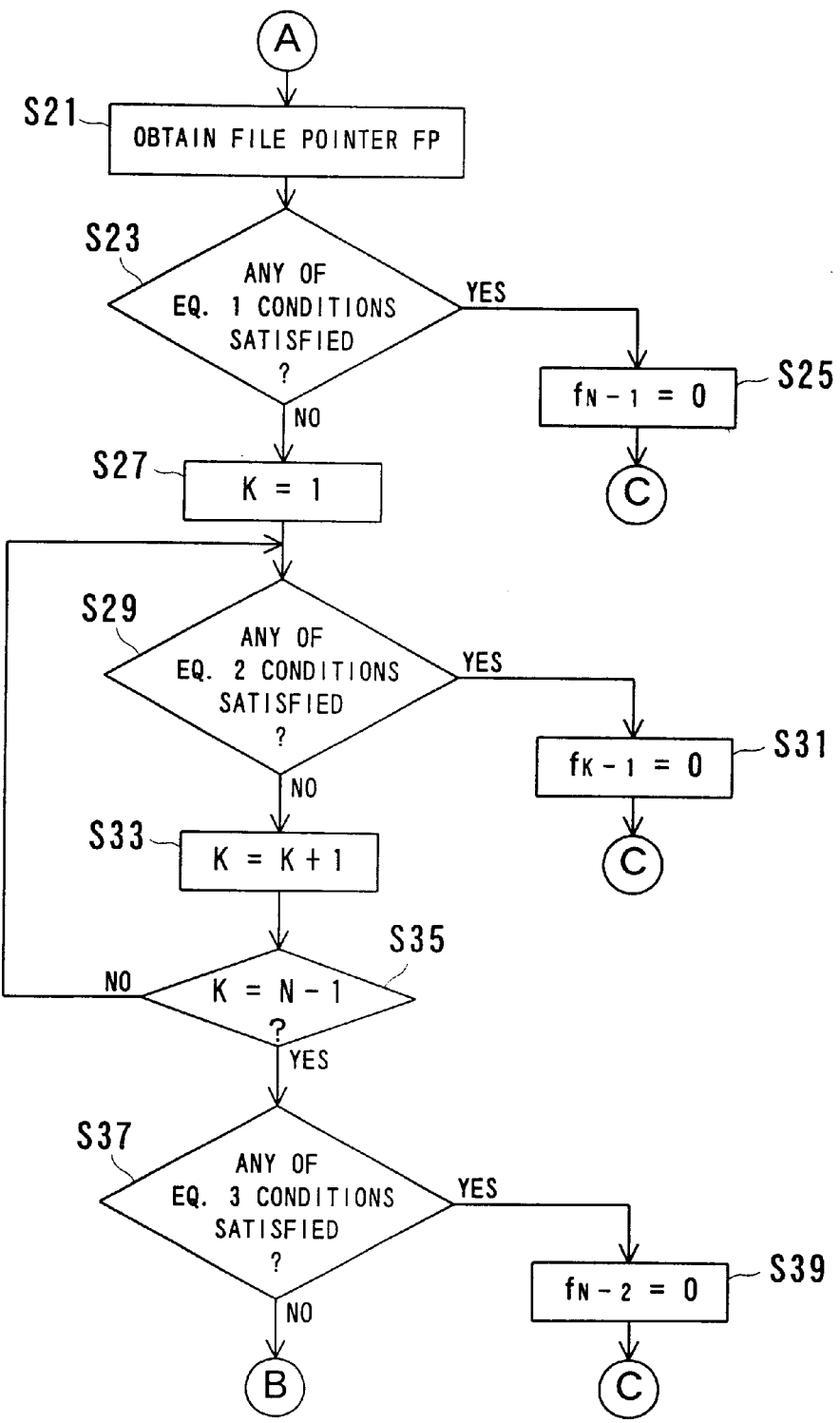
FIG. 6 is a flowchart showing another part of the operation of the FIG. 1 embodiment.
Figure 7:
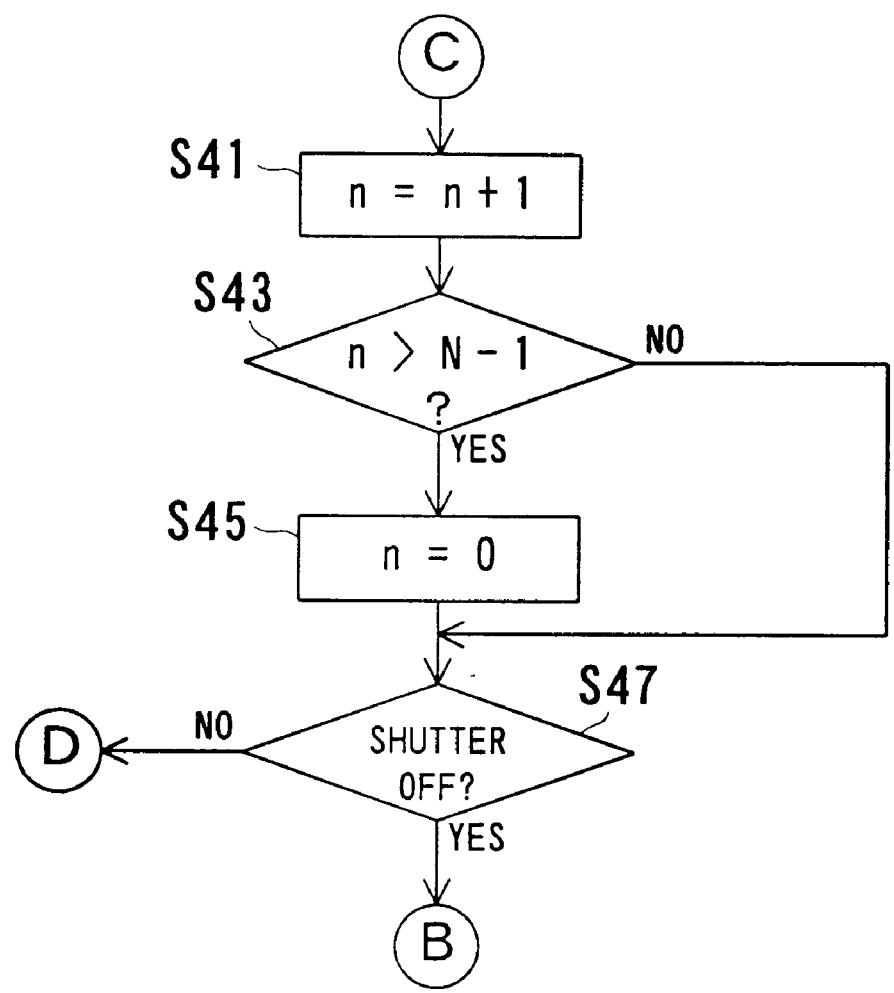
FIG. 7 is a flowchart showing still another part of the operation of the FIG. 1 embodiment.
Figure 8:
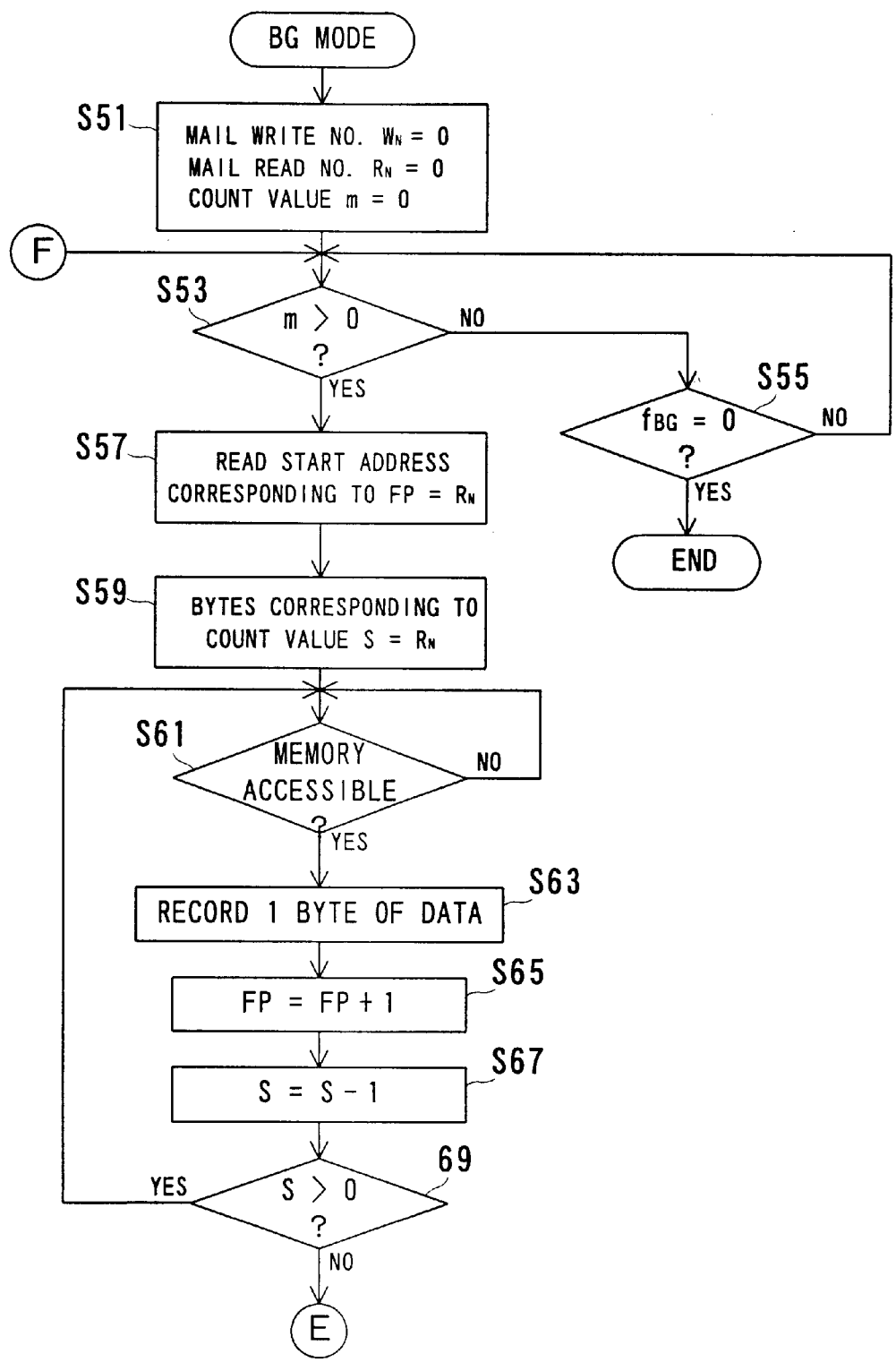
FIG. 8 is a flowchart showing yet another part of the operation of the FIG. 1 embodiment.
Figure 9:
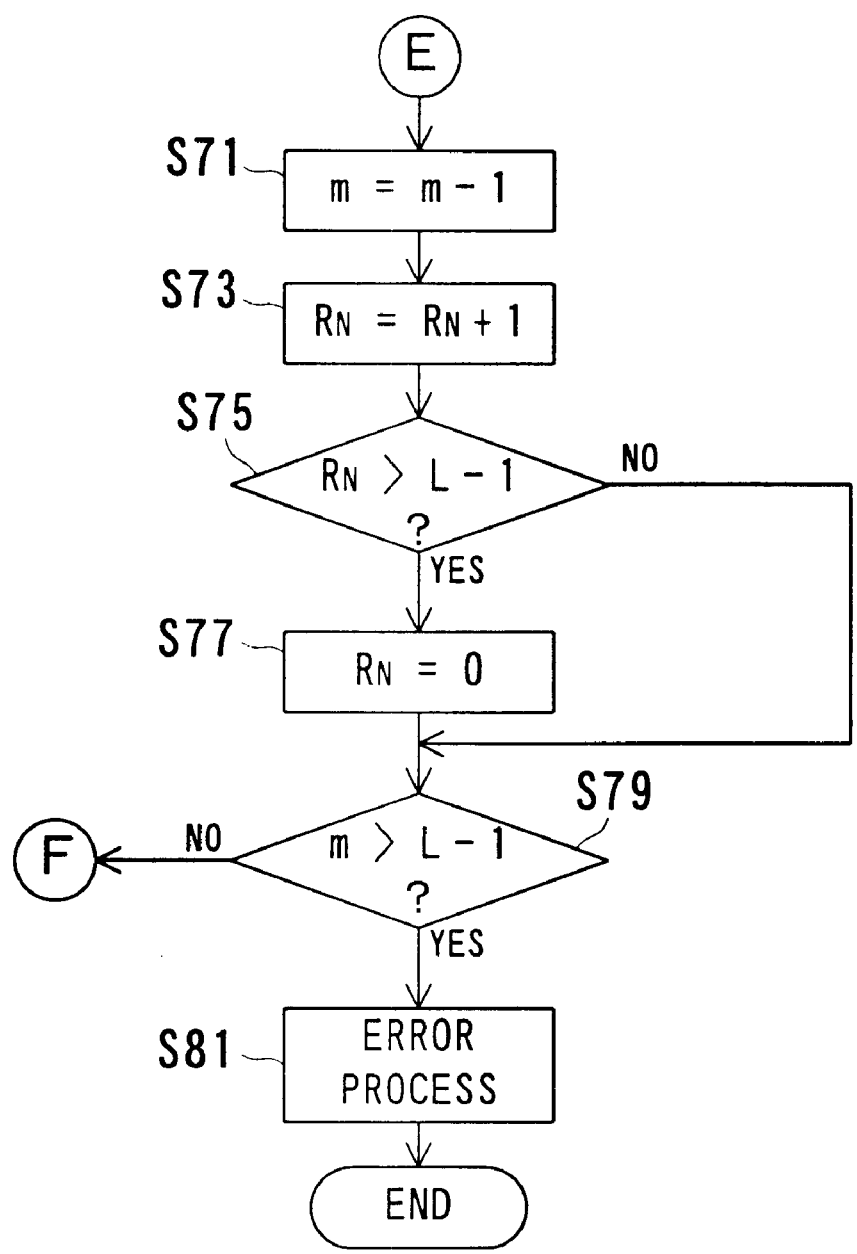
FIG. 9 is a flowchart showing another part of the operation of the FIG. 1 embodiment.

When the shutter button 58 is operated, the CPU 32 performs a write mode process (write process) shown in FIG. 5 to FIG. 7 and a BG mode process (record process) shown in FIG. 8 and FIG. 9. That is, the CPU 32 is installed with a multitask OS (real time OS) such as μiTRON, enabling concurrent execution of the above processings. Note that in a write mode process a subroutine as shown in FIG. 10 to FIG. 16 is executed as required.

Referring first to FIG. 5, the CPU 32 processes step S1 in response to pressing the shutter button 58. In step S1, a variety of variables are initialized by a subroutine shown in FIG. 10 and FIG. 11. The CPU 32 then in step S3 starts a BG (back Ground) mode, and in step S5 sets a BG mode flag $F_{BG}$. If a BG mode is started up, routine shown in FIG. 8 and FIG. 9 are put into concurrent processing.

In step S7 it is determined whether a block flag fn has been set or not. The initialization process of step S1 sets a block no. n at "0" and further resets all the block flags f0–f(N−1). Consequently, in first-round step S7 a block flag f0 is one to be determined. The determination result at this time is "YES". Note that the block flag fn corresponds to an image block n, sound block n and header block n.

Figure 12:
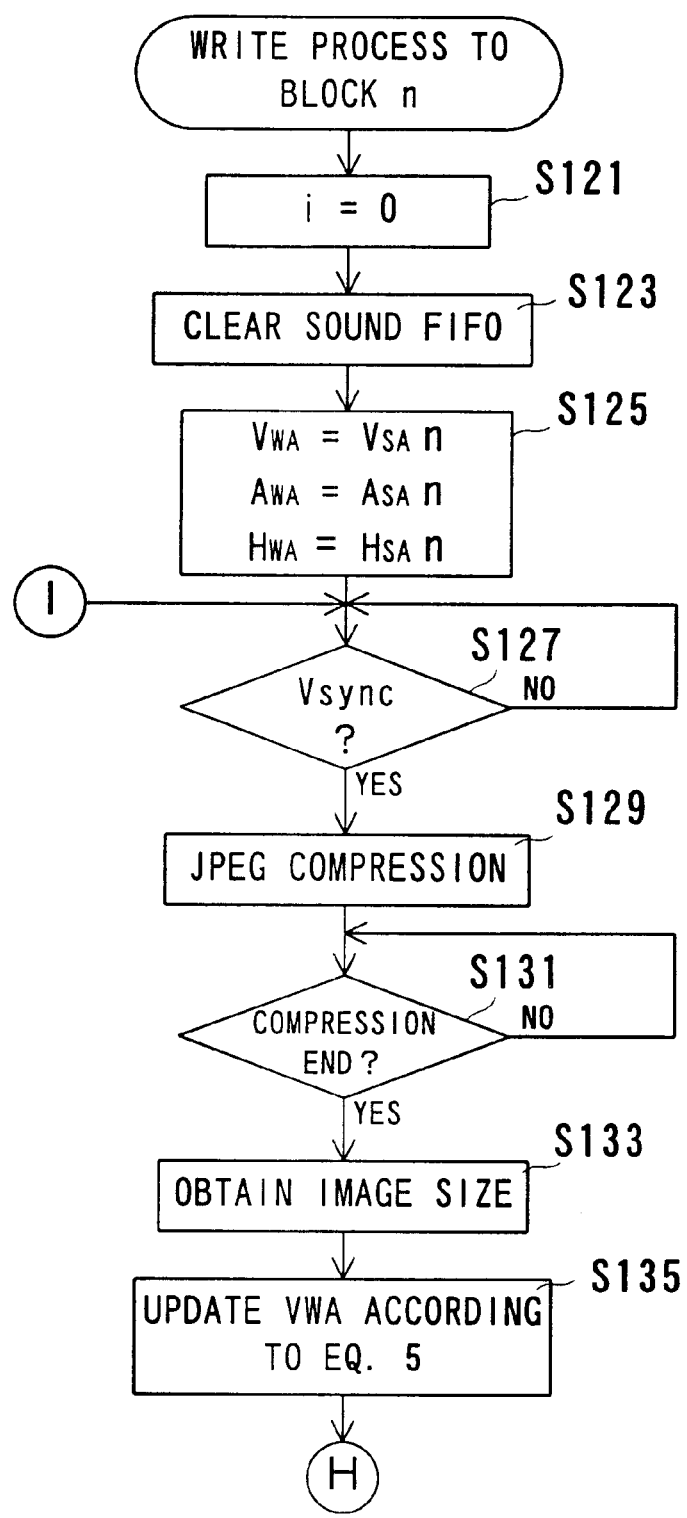
FIG. 12 is a flowchart showing another part of the operation of the FIG. 1 embodiment.
Figure 13:
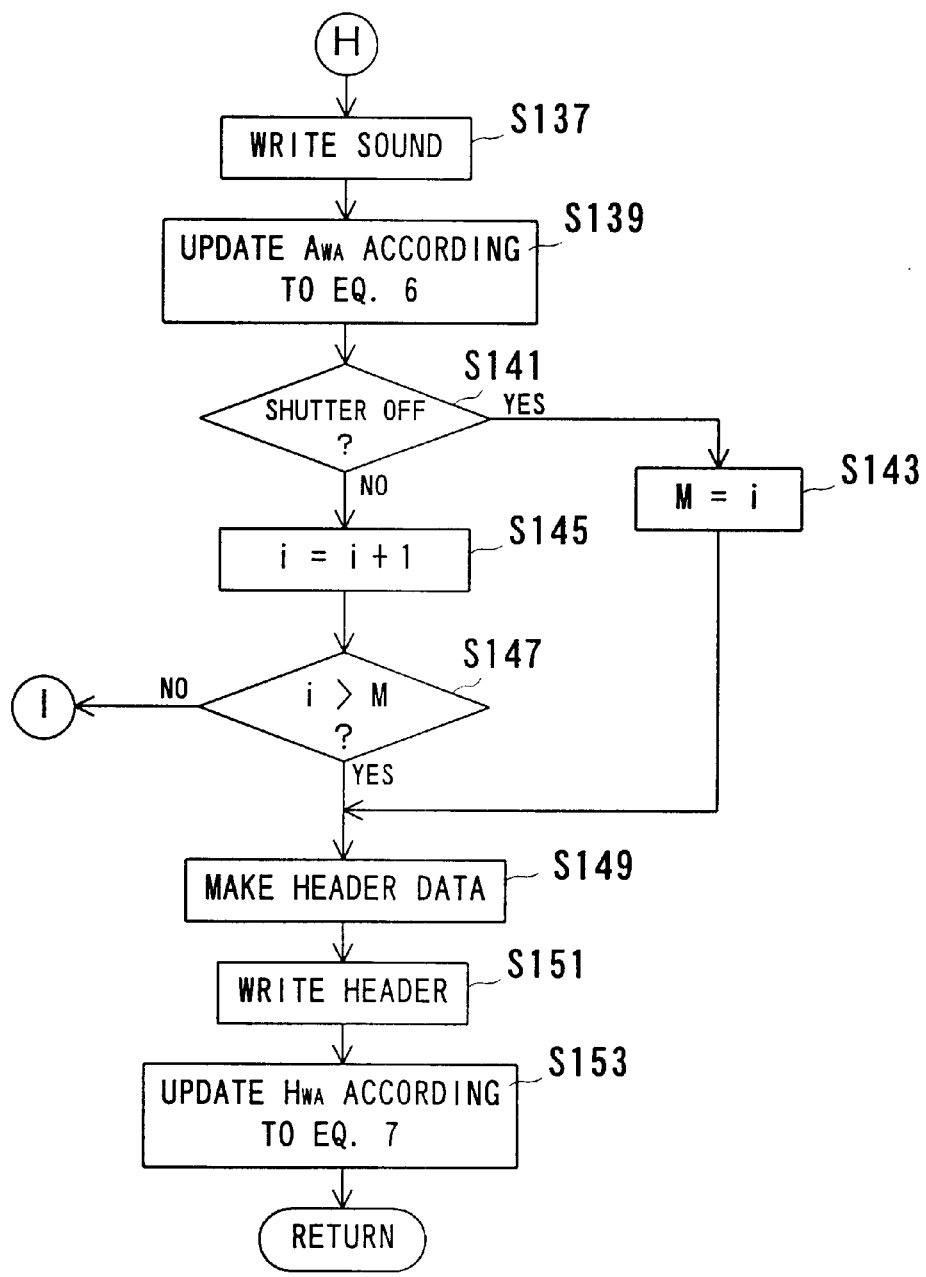
FIG. 13 is a flowchart showing still another part of the operation of the FIG. 1 embodiment.

Moving to step S9, the CPU 32 processes a subroutine shown in FIG. 12 and FIG. 13 to write compressed image data, sound data and header data to the respective image block n, sound block n and header block n. After completion of writing, the CPU 32 in step S11 sets the block flag fn. The block flag fn is set in response to a completion of writing to the block n, and reset in response to a completion of reading from the block n. The block flag fn in a set state signifies that data reading out of the block n is not completed.

Figure 14:
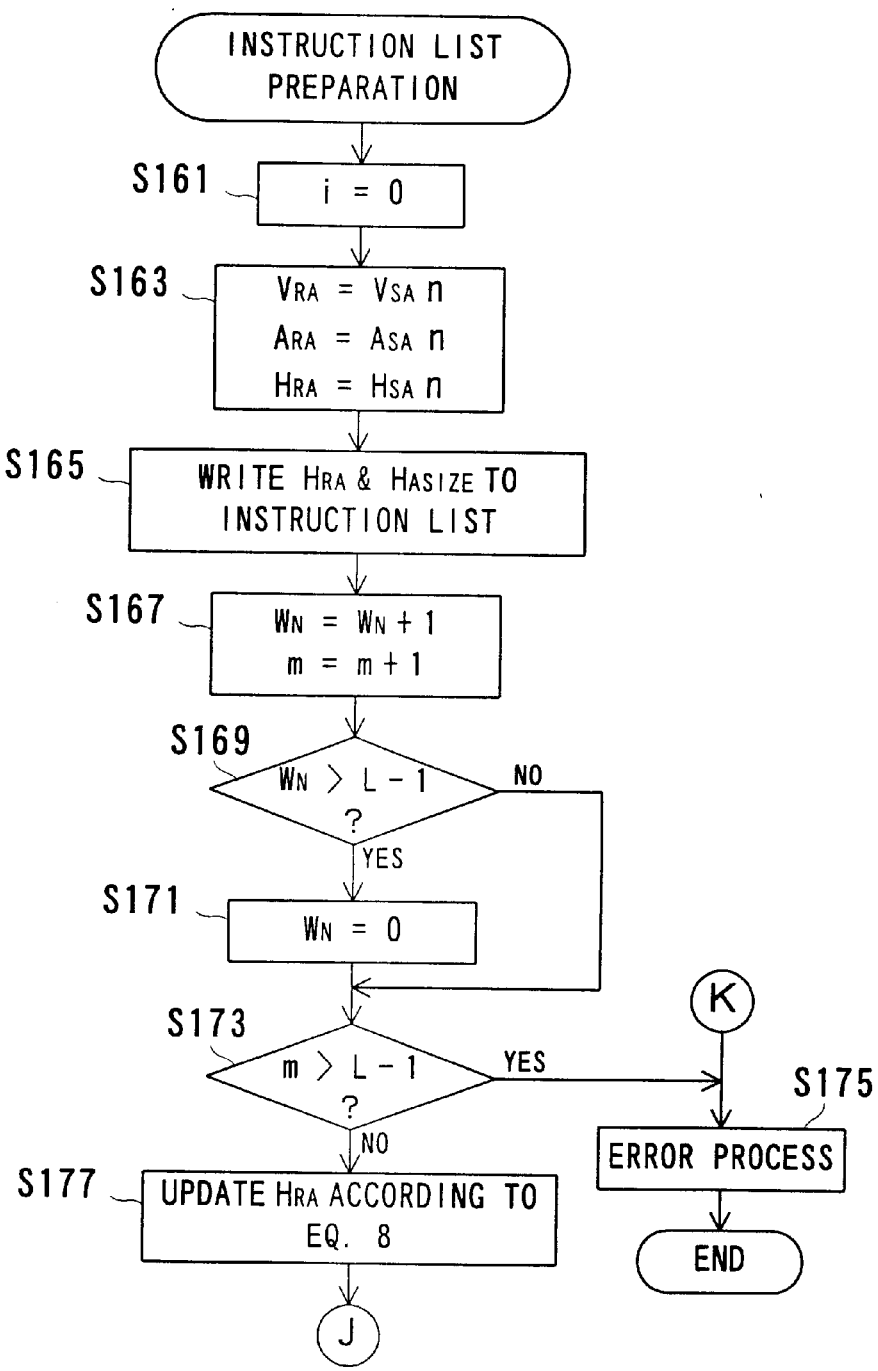
FIG. 14 is a flowchart showing yet another part of the operation of the FIG. 1 embodiment.
Figure 15:
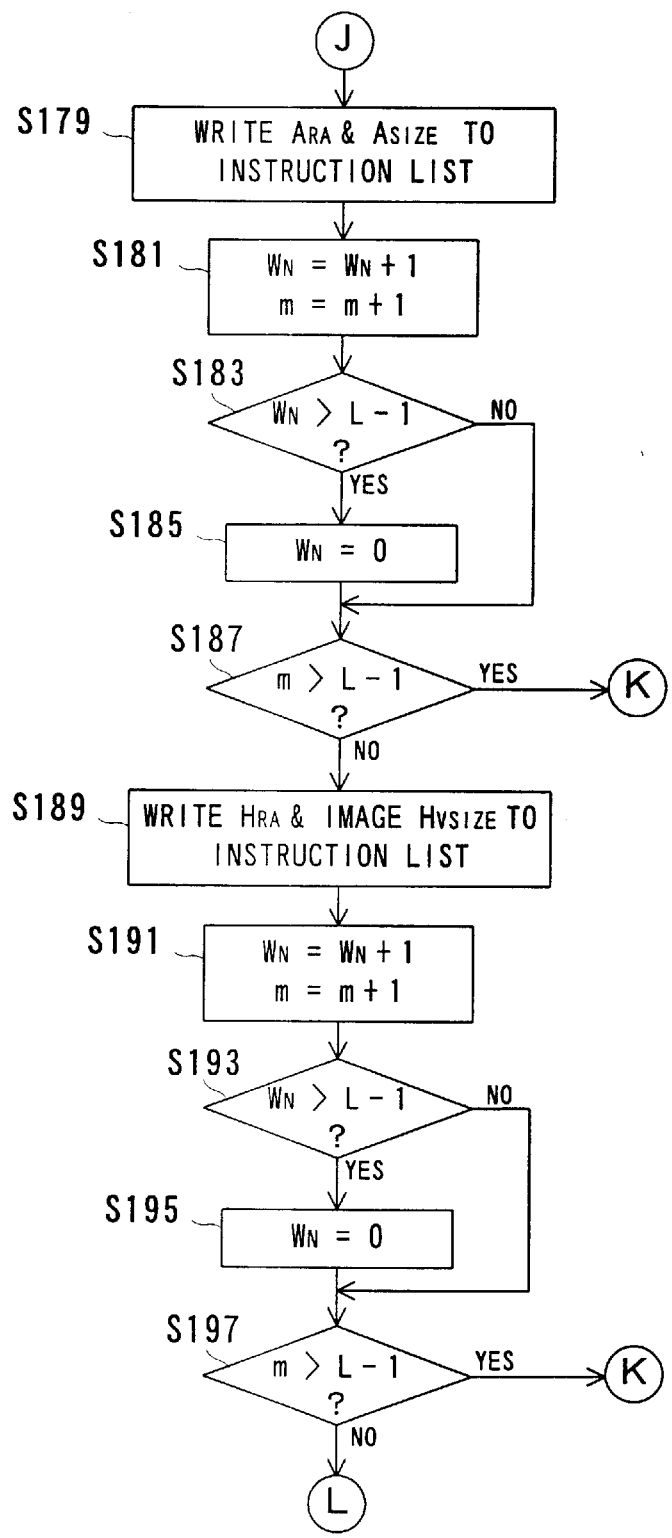
FIG. 15 is a flowchart showing another part of the operation of the FIG. 1 embodiment.
Figure 16:
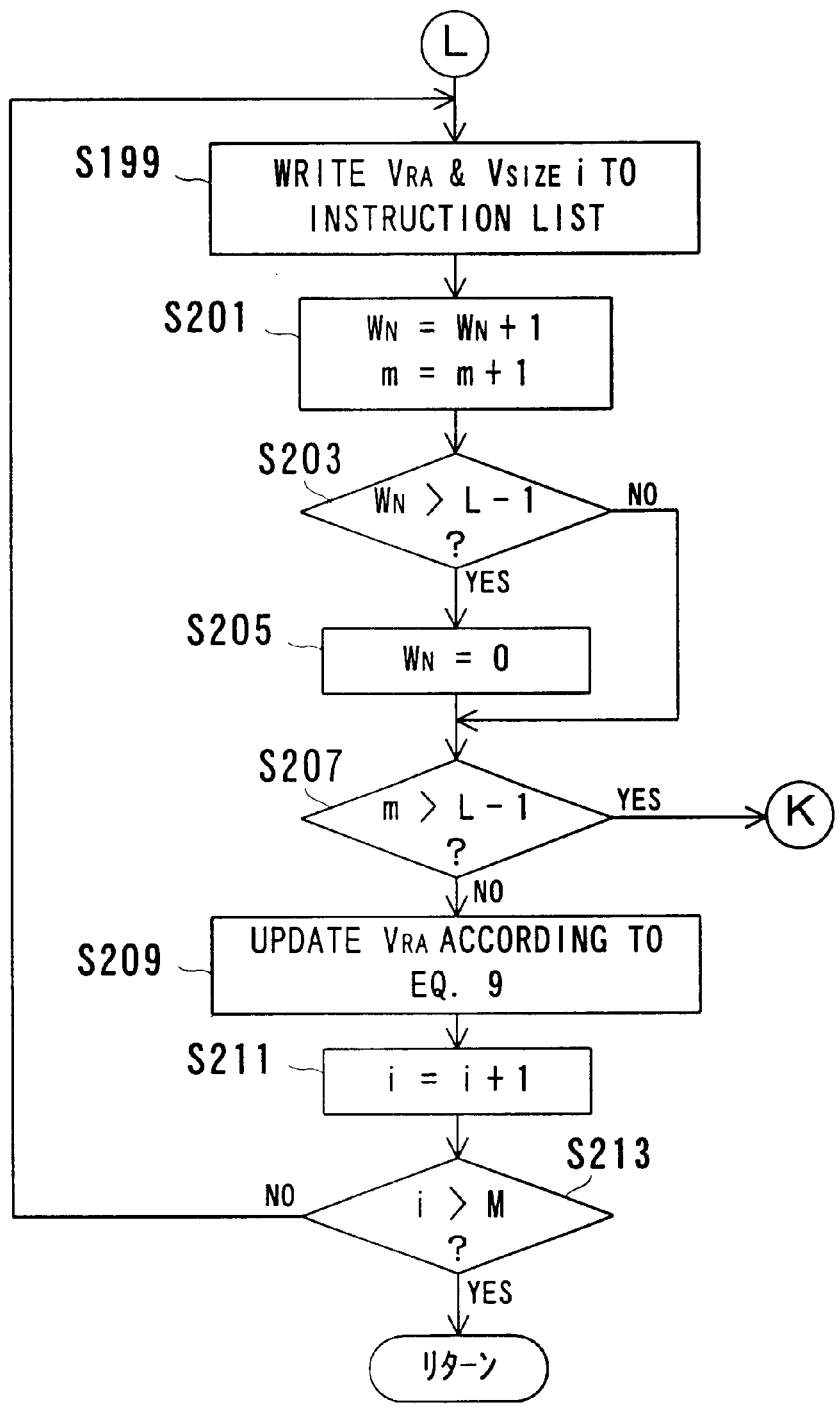
FIG. 16 is a flowchart showing a still another part of the operation of the FIG. 1 embodiment.

In step S13, a subroutine shown in FIG. 14 to FIG. 16 is processed to thereby prepare an instruction list related to the block n. The prepared instruction list is used in a BG mode process. The CPU 32, subsequently, in step S15 compares a count value M with "14" to determine whether the 15 frames of data has all been written to the block n or not. This makes it possible to determine whether the shutter button 58 was turned off during writing onto the block n or not. If the shutter button 58 was turned off in that duration, "YES" is determined in step S15 and the process advances to step S17. In step S17 the CCD imager 12 is disabled to suspend a shooting process. In the following step S18 the BG flag $f_{BG}$ is reset. Thereafter, in step S19 it is determined whether the BG mode process has ended or not. If "YES", the write mode process is ended.

On the other hand, if the shutter button 58 is kept pressed, the CPU 32 advances from step S15 to step S21 to acquire address information of a file pointer FP. It is determined in step S23 whether the file pointer FP is satisfied by conditions shown in Equation 1 or not.

$$V_{SA}0 \leq FP < V_{SA}1$$

$$A_{SA}0 \leq FP < A_{SA}1$$

$$H_{SA}0 \leq FP < H_{SA}1 \tag{1}$$

$V_{SA}0$: image block 0 head address
$A_{SA}0$: sound block 0 head address
$H_{SA}0$: header block 0 head address
$V_{SA}1$: image block 1 head address
$A_{SA}1$: sound block 1 head address
$H_{SA}1$: header block 1 head address If any one of the conditions is fulfilled, the read process in the BG mode is being made on the block 0. In this case, the CPU 32 advances to step S41 through resetting a block flag $f_{N-1}$ in step S25. On the other hand, if none of the conditions are satisfied, the CPU 32 in step S27 sets a block no. K to "1", and in step S29 determines whether the file pointer FP is satisfied by conditions shown in Equation 2 or not.

$$V_{SA}K \leq FP < V_{SA}(K+1)$$

$$A_{SA}K \leq FP < A_{SA}(K+1)$$

$$H_{SA}K \leq FP < H_{SA}(K+1) \tag{2}$$

$V_{SA}K$: image block K head address
$A_{SA}K$: sound block K head address
$H_{SA}K$: header block K head address
$V_{SA}(K+1)$: image block (K+1) head address
$A_{SA}(K+1)$: sound block (K+1) head address
$H_{SA}(K+1)$: header block (K+1) head address If any one of the conditions is satisfied herein, it is determined that data is being read out of the block K. In step S31 a block flag $f_{K-1}$ is reset and then the process proceeds to step S41. If none of the conditions are satisfied, the CPU 32 in step S33 increments the block no. K and in step S35 compares the current block no. K with "N−1". Unless K=N−1 is reached, the CPU 32 returns to step S29 to repeat the above process. If K=N−1 is reached, the CPU 32 advances to step S37 to determined whether the file pointer FP is satisfied by conditions of Equation 3 or not.

$$V_{SA}(N-1) \leq FP < V_{EA}$$

$$A_{SA}(N-1) \leq FP < A_{EA}$$

$$H_{SA}(N-1) \leq FP < H_{EA} \qquad (3)$$

$V_{SA}(N-1)$: image block (N−1) head address
$A_{SA}(N-1)$: sound block (N−1) head address
$H_{SA}(N-1)$: header block (N−1) head address
$V_{EA}$: compressed image area last address
$A_{EA}$: sound area last address
$H_{EA}$: header area last address In also this step, if any of the conditions is fulfilled, "YES" is determined while if none of the conditions are satisfied, "NO" is determined. The determination result of "YES" signifies that data reading is being made for a block (N−1). The CPU 32 in step S39 resets a block flag $f_{N-2}$ and then the process proceeds to step S41. Incidentally, if determined "NO", the CPU 32 directly returns to step S17.

As a result of processing of the above steps S21–S39, when all the data has been read out of the block n in the BG mode process, a block flag n correspond thereto is reset.

In step S41 the block no. n is incremented, and in the succeeding step S43 the current block no. N is compared with "N−1". If "NO", the process directly advances to step S47. However, if "YES", in step S45 the block no. n is reset and then the process proceeds to step S47. In the step S47 it is determined whether the shutter button 58 is shifted off or not. If "NO", the process returns to step S7 whereas if "YES", the process moves to step S17. As will be understood from the steps S41–S45, the block no. n is reset after being incremented up to "N−1". Consequently, the image block, sound block and header block as write destinations are designated in a cyclic fashion so that compressed image data, sound data and header data are each written in a ring fashion.

Such cyclical writing is suspended simultaneously with putting off the shutter button. That is, even where the shutter button 58 is put off at any of time points of during writing to the block n or upon completing of writing to the block n, the write mode process is suspended in response to such off operation. The data held in the SDRAM 28 is recorded onto the memory card 36 by the BG mode process.

The write mode process is suspended not only when the shutter button 58 is put off but also when "NO" is determined in step S7. Such forcible suspension from writing is carried out in a case where the read rate from the SDRAM 28 is slower than the write rate thereto and data write is to be made onto a block having not been completed of data reading. This prevents unread data from being overwritten by the succeeding data.

The BG mode process will be explained with reference to FIG. 8. The CPU 32 first in step S51 resets a mail write number $W_N$, a mail read number $R_N$ and a count value m. Then, it is determined in respective steps S53 and S55 whether the count value m is greater than "0" or not and whether a BG flag $f_{BG}$ has been reset or not. If m>0, the process advances from step S53 to step S57. If m≦0 and the BG flag $f_{BG}$ is in a set state, the process returns to step S53. If m≦0 and the BG flag $f_{BG}$ is in a reset state, the process is ended.

Although the count value m is reset in step S51, the value is incremented by the above write mode process, specifically, by the instruction list preparation process in step S13. This provides m>0 providing determination "YES" in step S53. Thereupon, the CPU 32 in step S57 sets the file pointer FP to a corresponding read start address to the mail read number $R_N$ and the count value S to a corresponding data size to the mail read number $R_N$. In the above step S13 an instruction list 32a is prepared that is as shown in FIG. 4. According to FIG. 4, a read start address and a data size expressed in byte are put in correspondence to a mail no. In step S57 and S59, a mail no. having a same value as the current mail read number $R_N$ is detected from the instruction list 32a, and a read start address and data size are read out that correspond to the detected mail no. The read address data and size data are respectively set to the file pointer FP and the count value S.

The CPU 32 subsequently in step S61 determines whether access to the SDRAM 28 is possible or not. While the shutter button 58 is being pressed, the memory control circuit 26 receives access requests not only from the CPU 32 but also from the signal processing circuits 22 and 46, the JPEG CODEC 30 and the video encoder 38. The memory control circuit 26 performs write/read operation to or from the SDRAM 28 while mediating between these requests. Consequently, in step S61 a request is outputted to the memory control circuit 26. "YES" is determined when a permission signal is sent back from the memory control circuit 26. Upon outputting a request in step S61, the CPU 32 simultaneously outputs address information possessed by the file pointer FP. The memory control circuit 26 reads 1-byte data out of the SDRAM according to such address information. Due to this, the CPU 32 receives 1-byte data following the permission signal.

The CPU 32 in step S63 records the input 1-byte data onto the memory card 36, and in steps S65 and S67 renews the file pointer FP and count value S. The address information possessed by the file pointer FP is incremented while the count value S is decremented. In step S69 the count value S is compared with "0". If S>0, the process returns to step S61. As a result, the process of the steps S61–69 is repeated until the corresponding data to the current read number $R_N$ has all been recorded onto the memory card 36.

When the count value S becomes "0", the CPU 32 determines that the corresponding data to the current mail read number $R_N$ has been read out, and in step S71 decrements the count value m. The count value m is incremented by the instruction list preparation process and decremented by this step. Accordingly, the count value m signifies an amount of data having been written in but not yet read out of the SDRAM 28.

Then, the CPU 32 in step S73 increments the mail read number $R_N$, and in step S75 compares the current mail read number $R_N$ with "L−1". As will be understood FIG. 4, "L−1" is a maximum mail no. value (e.g. 1999). Consequently, if $R_N \leq L-1$, the process directly advances to step S79. However, if $R_N > L-1$, in step S75 the mail read number $R_N$ is reset and then the process advances to step S79. As a result, the mail read number $R_N$ also is renewed in a cyclic fashion.

In step S79 the count value m is compared with "L−1". Because the count value m in usual case does not succeed "L−1", the CPU 32 in this step determines "NO" and the process returns to step S53. As a result, the above process of the steps S53–S79 is repeated, thereby recording the data stored in the SDRAM 28, in order, onto the memory card 36. Meanwhile, in the case that the count value m exceeds "L−1", "YES" is determined in step S79, and the BG mode process is ended through an error process of step S81. The state m>L−1 occurs where the decrement rate in the count value m is abnormally slower than the increment rate thereof, i.e. where the read rate from the SDRAM 28 is abnormally slower than the write rate thereto. In such a case, the BG mode process is forcibly ended.

Figure 10:
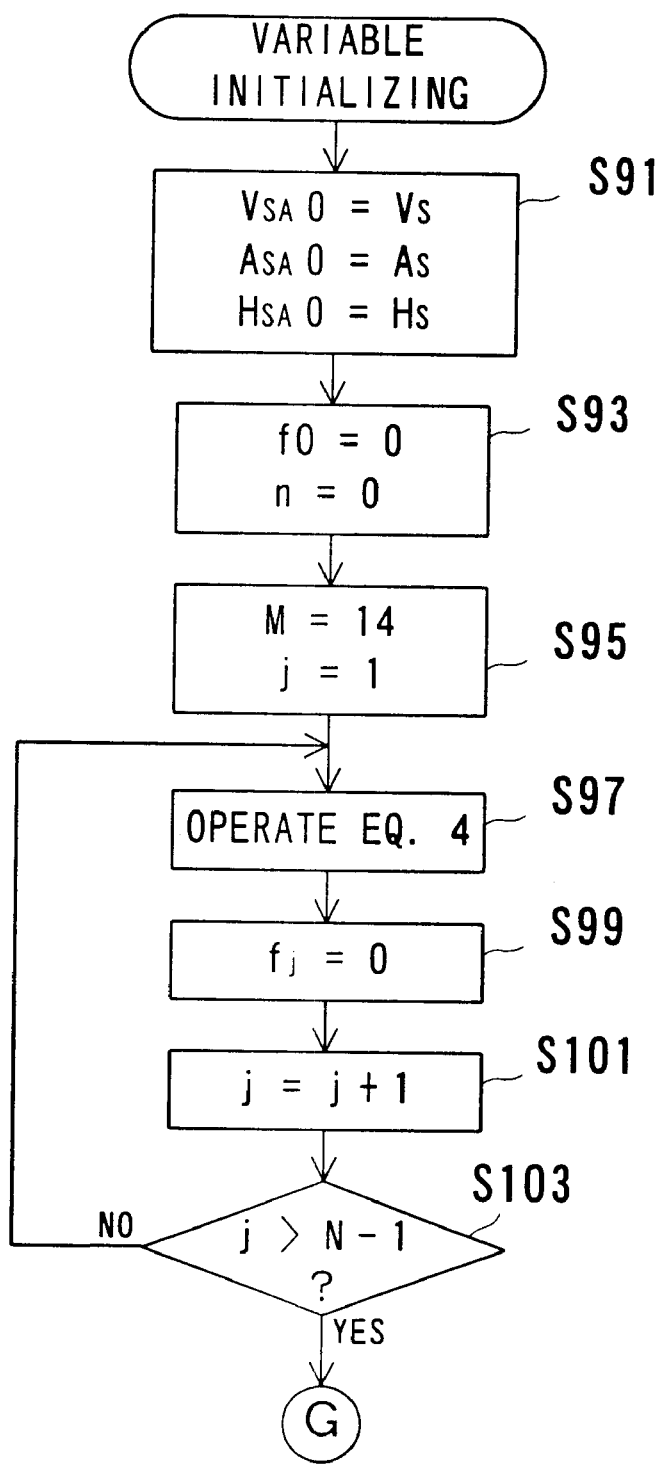
FIG. 10 is a flowchart showing yet another part of the operation of the FIG. 1 embodiment.
Figure 11:
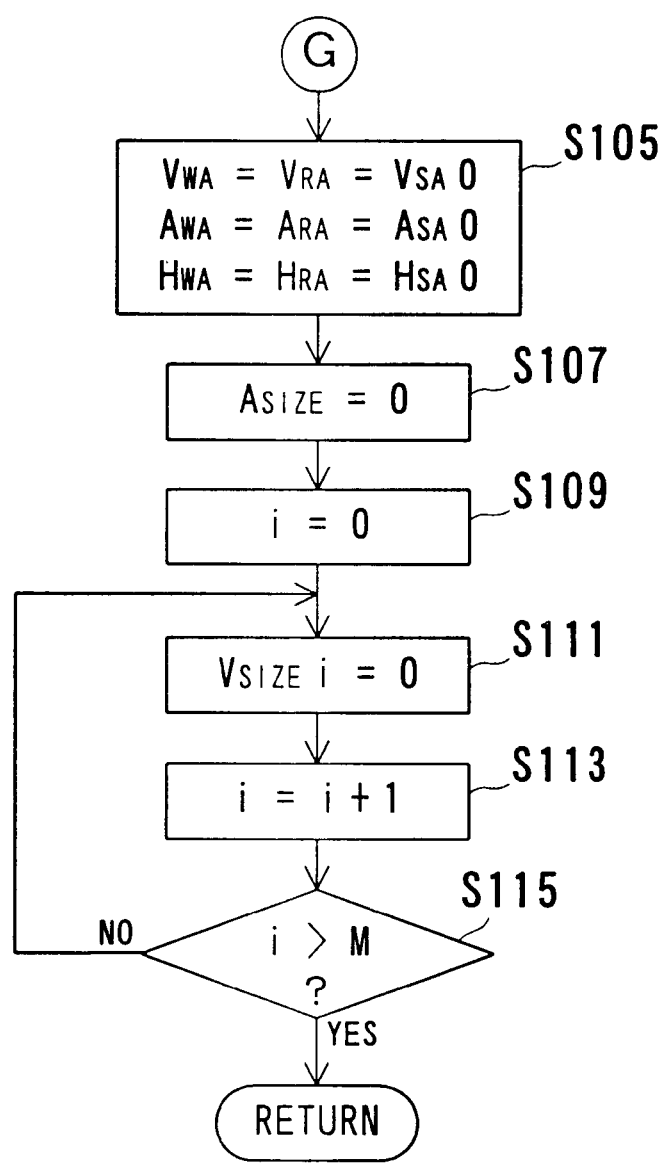
FIG. 11 is a flowchart showing yet another part of the operation of the FIG. 1 embodiment.

Referring to FIG. 10 and FIG. 11, explanations will be made on detailed processes for initializing various valuables. The CPU 32 first in step S91 sets a head address $V_{SA}0$ of the image block 0 to a head address $V_S$ of the compressed image area, a head address $A_{SA}0$ of the sound block 0 to a head address $A_S$ of the sound area, and a head address $H_{SA}0$ of the header block 0 to a head address $H_S$ of the header area. Next, in step S93 a block flag f0 and block no. n are reset, and in step S95 a count value M and block no. j are respectively set to "14" and "1".

Then, the CPU 32 advances to step S97 to calculate a head address $V_{SA}j$ of an image block j, a head address $A_{SA}j$ of a sound block j and a head address $H_{SA}j$ of a header block j.

$$V_{SA}j = V_{SA}(j-1) + V_{MAXSIZE} \times 15$$

$$A_{SA}j = A_{SA}(j-1) + A_{SIZE}$$

$$H_{SA}j = H_{SA}(j-1) + H_{AVSIZE} \qquad (4)$$

$V_{MAXSIZE}$: the maximum size of 1-frame compressed image data $A_{SIZE}$: the size of 1-second sound data $H_{AVSIZE}$: the size of sound and image headers Although the size of compressed image data differs depending upon an optical image of a subject, a maximum size $V_{MAXSIZE}$ is previously determined. Consequently, a head address $V_{SA}j$ is determined by adding "$V_{MAXSIZE} \times 15$" to a head address $V_{SA}(j-1)$. On the other hand, sound data is not compressed and the size of 1-second sound data is known. It is therefore possible to determine a head address $A_{SA}j$ by adding "$A_{SIZE}$" to the address $A_{SA}(J-1)$. Because the size of header data is know, a head address $H_{SA}j$ can be determined by the above calculation. Incidentally, $H_{AVSIZE}$ is a total size of one sound header and one image header.

In step S99 a block flag fj is reset, and in step S101 the block no. j is incremented. Then, in step S103 the current block no. j is compared with "N−1". If j≦N−1, the process returns to step S97. Consequently, the process of the steps S97–S101 is repeated, thereby calculating respective head addresses of image blocks 1 to (N−1), sound blocks 1 to (N−1) and header blocks 1 to (N−1). The process of the steps S97–S101 as well as the process of the first step S91 provide image blocks of N in the number, sound blocks of N in the number and the blocks N in the number that are formed in the SDRAM 28 as shown in FIG. 3.

After determining "YES" in step S103, the CPU 32 proceeds to step S105 to set an image write address $V_{WA}$ and image read address $V_{RA}$ to a head address $V_{SA}0$ of the image block 0, a sound write address $A_{WA}$ and sound read address $A_{RA}$ to a head address $A_{SA}0$ of the sound block 0, and a header write address $H_{WA}$ and header read address $H_{RA}$ to a head address $H_{SA}0$ of the header block 0.

Subsequently, in step S107 rendered "0" is a size $A_{SIZE}$ of the sound data to be written to the sound block 0, and in step S109 a frame no. i is reset. In step S111 rendered "0" is a size $V_{SIZE}i$ of the compressed image data of an ith frame, and in the subsequent step S113 the frame number i is incremented. In step S115 the frame number i is compared with the count value M(=14). The process of the steps S111 and S113 is repeated until i>M is reached. As a result, the various valuables related to the block 0 are set at "0". If i>M comes, the CPU 32 returns to the routine shown in FIG. 5.

Referring to FIG. 12, explanations will be made on a write process to the block n. the CPU 32 first in step S121 resets a frame number i, and then in step S123 clears an FIFO memory 46a provided in the signal processing circuit 46. Subsequently, in step S125 an image write address $V_{WA}$ is set to a head address $V_{SA}n$, a sound write address $A_{WA}$ is set to a head address $A_{SA}n$ of the sound block n, and a header write address $H_{WA}$ is set to a head address $H_{SA}n$ of the header block n. If thereafter a vertical synchronizing signal is outputted from the SG16, in step S129 a image compressing command is outputted to the JPEG CODEC 30. Incidentally, when outputting an image compression command, the CPU 32 outputs also an image write address $V_{WA}$ to the JPEG CODEC 30.

The JPEG CODEC 30, in response to the image compression command, requests the memory control circuit 26 to read out still image data. As a result, 1 frame of still image data stored in the display image area shown in FIG. 3 is read out by the memory control circuit 26, and inputted to the JPEG CODEC 30 via the buses 24b and 24a. The JPEG CODEC 30 performs JPEG compression on the input still image data to produce compressed image data. Completing 1-frame compression, the JPEG CODEC 30 requests the memory control circuit 26 to write the produced compressed image data. Upon request, the JPEG CODEC 30 outputs the above image write address $V_{WA}$, in addition to the compressed image data and request signal, to the memory control circuit 26. In response, the memory control circuit 26 writes the given compressed image data in and following the image write address $V_{WA}$.

The CPU 32 in step S129 outputs an image compressing command and then in step S131 determines whether the compression process has been ended or not. If the compression process has been ended is determined herein, the CPU 32 advances to step S133 to acquire a data size $V_{SIZE}i$ of the compressed image data produced at this time. The JPEG CODEC 30 outputs an end signal and data size signal each time compression process by 1 frame has been ended. Accordingly, in step S131 determination is made according to the end signal whether the compression process has ended or not, and in step S133 detection is made on a data size $V_{SIZE}i$ from the data size signal. In step S135 Equation 5 is arithmetically operated to renew the image write address $V_{WA}$ according to the data size $V_{SIZE}i$.

$$V_{WA} = V_{WA} + V_{SIZE}i \qquad (5)$$

Subsequently, the CPU 32 in step S137 supplies a sound process command, together with the sound write address $A_{WA}$, to the signal processing circuit 46. The sound signal caught by the microphone 42 is converted into sound data by the A/D converter 44. The signal processing circuit 46 fetches the sound data in response to the sound processing command and write it to the FIFO memory 46a. The signal processing circuit 46 also reads $\frac{1}{15}$th of a second or $A_{SIZE}/15$ bytes of audio data out of the FIFO memory 46a and outputs it, together with a request signal and sound write address $A_{WA}$, to the memory control circuit 26. As a result, the $A_{SIZE}/15$-bytes sound data outputted from the signal processing circuit 46 is written in and following the sound write address $A_{WA}$ by the memory control circuit 26.

The CPU 32 in step S137 outputs a sound processing command, and then in step S139 renews the sound write address $A_{WA}$ according to Equation 6. Because the size of $\frac{1}{15}$th of a second of sound data is previously known, the sound write address $A_{WA}$ can be renewed without receiving a data size signal from the signal processing circuit 46.

$$A_{WA} = A_{WA} + A_{SIZE}/15 \qquad (6)$$

In step S141 it is determined whether the shutter button 58 was put off or not. If "YES" here, the CPU 32 in step S143 sets a current frame number to the count value M, and the process advances to step S149. If the shutter button 58 is being kept pressed, the CPU 32 in step S145 increments the frame number i and in step S147 compares the current frame number i with the count value M(=14). If i≦M, the CPU 32 returns to step S127 to repeat the above process. However, if i>M, the process proceeds to step S149.

In step S149 created are sound header data corresponding to the above sound data and image header data corresponding to the above compressed image data. In step S151 these of the data are outputted, together with a request signal and header write address $H_{WA}$, to the memory control circuit 26. The memory control circuit 26 writes the supplied sound header data and image header data in this order in and following the header write address $H_{WA}$. In step S153 the header write address $H_{WA}$ is renewed according to Equation 7, and the process returns to the routine of FIG. 5.

$$H_{WA} = H_{WA} + H_{ASIZE} + H_{VSIZE} \quad (7)$$

$H_{ASIZE}$: the size of sound header data $H_{VSIZE}$: the size of image header data After subjected to the write process, 15 frames (or less than 15 frames) of compressed image data is stored in the image block n while 1 second (or less than 1 second) of sound data is in the sound block n. The corresponding header data is stored in the header block n.

The instruction sheet preparation process of step S13 in FIG. 5 will be explained with greater detail, with reference to FIG. 14 to FIG. 16. The CPU 32 first in step S161 reset a frame number i. Next, in step S163, an image block n head address $V_{SA}n$, a sound block n head address $A_{SA}n$ and a header block n head address $H_{SA}n$ are set, respectively, to an image read address $V_{RA}$, a sound read address $A_{RA}$ and a header read address $H_{RA}$.

The CPU 32 subsequently proceeds to step S165 to write the header read address $H_{RA}$ and sound header size $H_{ASIZE}$ into an instruction list 32a shown in FIG. 4. Specifically, a mail no. is detected that is same in number as a current mail write no. $W_N$, and the header read address $H_{RA}$ and sound header size $H_{ASIZE}$ are written to a corresponding position to the detected mail no. Because the mail no. $W_N$ is reset in step S51 shown in FIG. 8, the header read address $H_{RA}$, and sound header size $H_{ASIZE}$ in first-round step S165 are written in a corresponding position to $W_N=0$. The CPU then in step S167 increments the mail write number $W_N$ and count value M, and in step S169 compares the current mail write number $W_N$ with "L−1". If WN≦L−1 herein, the process directly advances to step S173. However, if $W_N>L-1$, then in step S171 the mail write number $W_N$ is reset and then the process advances to step S173.

In step S173, the count value m is compared with "L−1". The count value usually satisfies a condition M≦L−1. Consequently, the CPU 32 in step S177 renews the header read address $H_{RA}$ according to Equation 8, and then the process proceeds to step S179.

$$H_{RA} = H_{RA} + H_{ASIZE} \quad (8)$$

Incidentally, in the case where the BG mode process is abnormally slow so that the increment rate of count value m greatly exceeds the decrement rate thereof to thereby give m>L−1, "YES" is determined in step S173. At this time, the CPU 32 in step S175 performs an error process, thereby forcibly ending the write mode process.

In step S179 the sound read address $A_{RA}$ and sound size $A_{SIZE}$ are written by being put in correspondence to the current mail read number $R_N$ into the instruction list 32a. The CPU 32 subsequently in steps S181–S187 carries out a similar process to that of the steps S167–S173. When determined "YES" in step S187, the process moves to step S175 whereas when determined "NO" the process proceeds to step S189. Incidentally, the sound read address $A_{RA}$ is no longer required from now on and accordingly not subjected to a renewal process.

In step S189 the header read address $H_{RA}$ and image header size $H_{VSIZE}$ are written by being put in correspondence to the current mail write number $W_N$ into the instruction list 32a. Then, in steps S191–S197 a similar process is performed to that of steps S167–S173. If determined "NO" in step S197, the process proceeds to step S199.

In step S199, the image read address $V_{RA}$ and the image size $V_{SIZE}i$ obtained in the above step S133 are written in a corresponding position to the current mail write number $W_N$. In steps S201–S207 a similar process to that of steps S167–S173 is performed. When determined "NO" in step S207, in step S209 the image read address $V_{RA}$ is renewed according to Equation 9.

$$V_{RA} = V_{RA} + V_{SIZE}i \quad (9)$$

After writing to the instruction list 32a the related address data and size data to the ith-frame image, the CPU in step S211 increments the frame number i. In step S213 the current frame number i is compared with the count value M(≦14) to repeat the process of steps S199–S213 until i>M is reached. This results in acquisition, in the instruction list 32a of related address data and size data to the 15 frame of compressed image data written in the image block n. When i>M is reached, the CPU 32 in step S213 determines "YES" and the process returns to the routine of FIG. 5.

According to this embodiment, when writing compressed image data, sound data and header data to the SDRAM, cyclical access is made to the sound area and header area. When also reading out such data, cyclical access is made to the compressed image area, sound area and header area. Accordingly, even where the SDRAM is small in capacity, a long time of motion images and sounds can be recorded on the memory card. Meanwhile when the write rate to the SDRAM is faster than the read rate and the write block is catching up with the read block, the write mode is forcibly suspended. This prevents unread data from being overwritten by the succeeding data.

Although this embodiment recorded JPEG-compressed image data on the memory card, the image data to be recorded on the memory card may be MPEG-compressed data or non-compressed image data.

Figure 17:
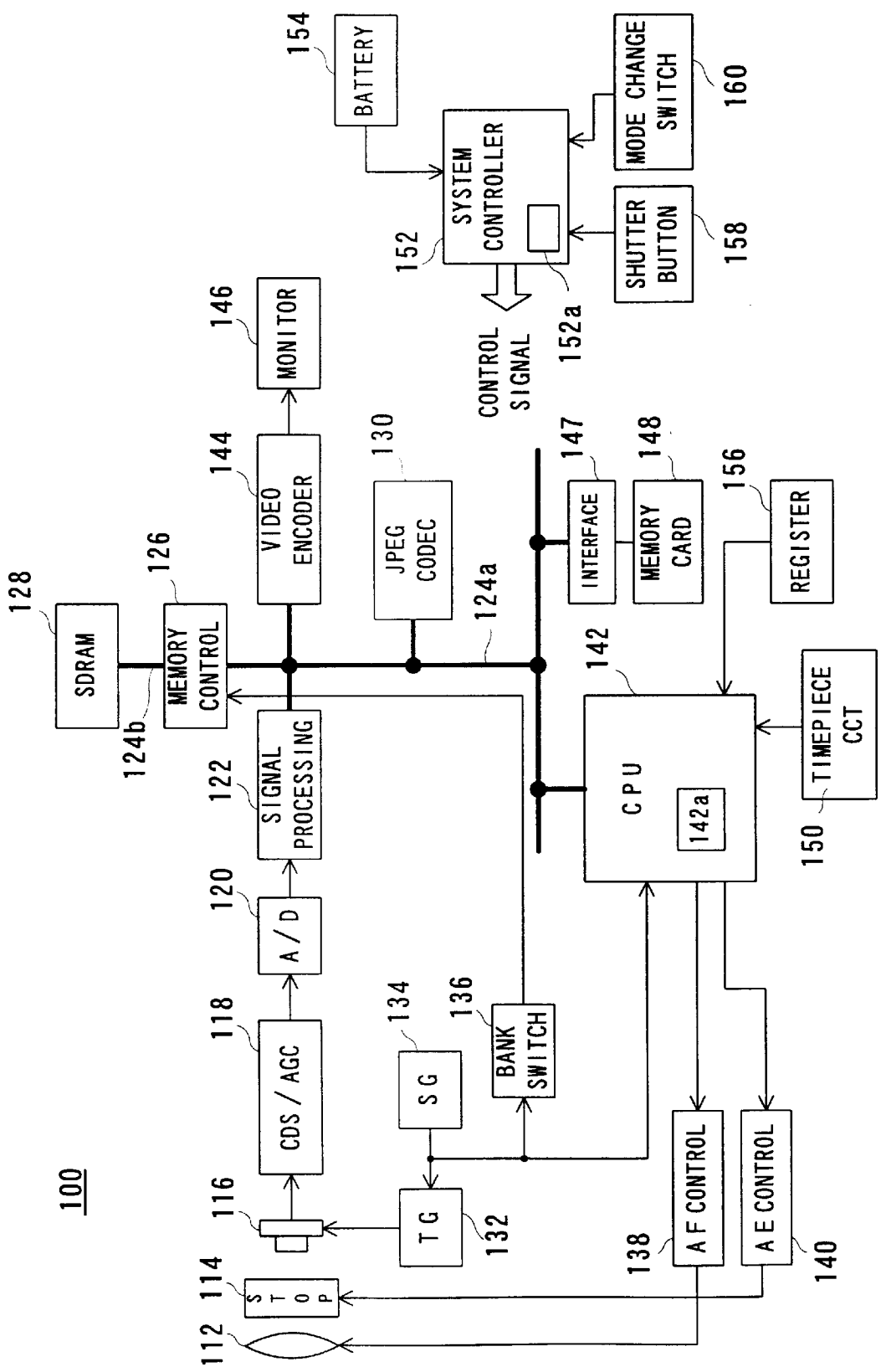
FIG. 17 is a block diagram showing another embodiment of the present invention.

Referring to FIG. 17, a digital camera 100 of this embodiment includes a focus lens 112 and an aperture stop unit 114. An optical image of a subject is taken through these members to a CCD imager 116. If a mode set switch 160 is shifted to a "CAMERA" side, a system controller 152 notifies a CPU 142 to set for a camera mode. The CPU 142, in turn, starts up a signal processing block, including a signal generator (SG) 134, a signal processing circuit 122 and a bank switch circuit 136, and an encode block, including a video encoder 144 and a monitor 146.

Figure 18:
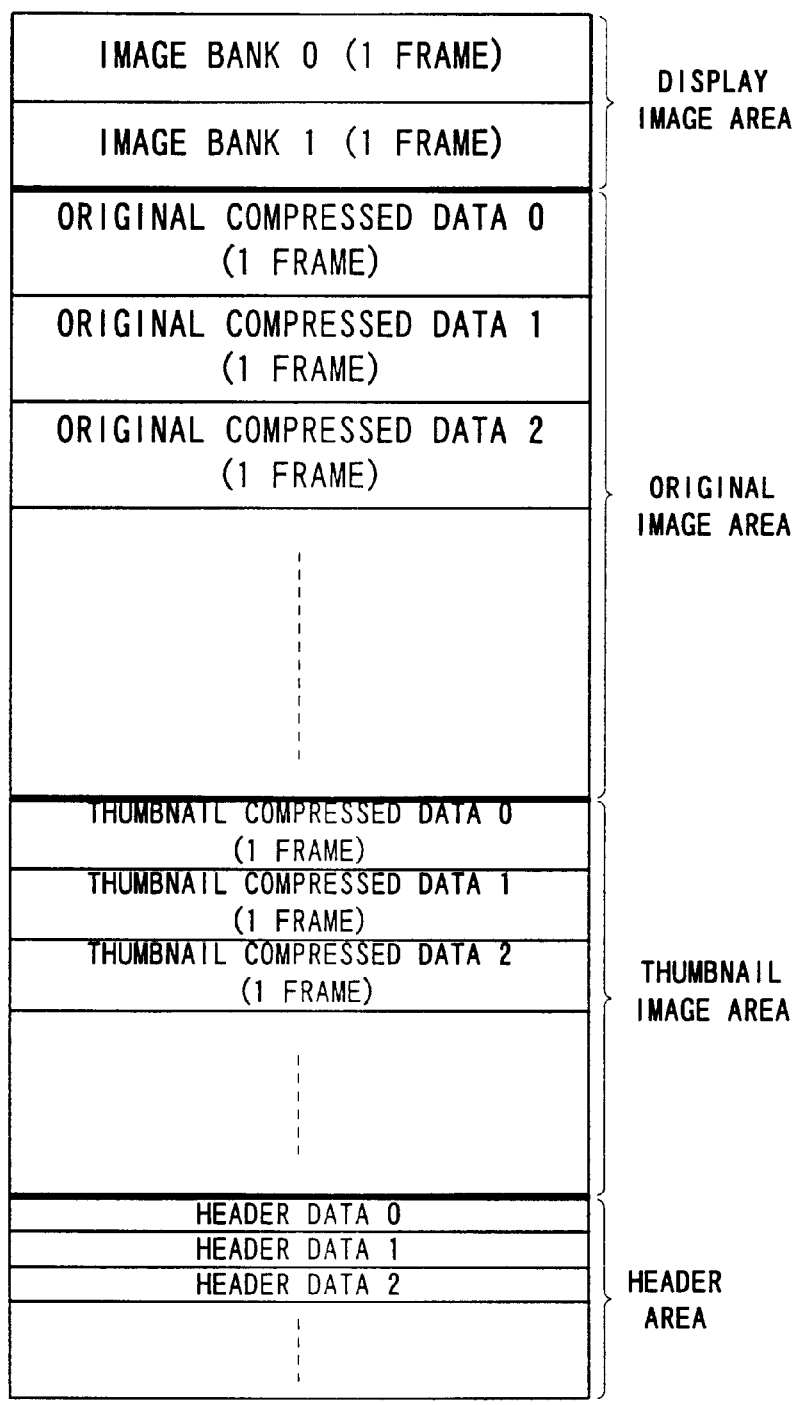
FIG. 18 is an illustrative view showing an SDRAM applied in the FIG. 17 embodiment.

The bank switch circuit 136 produces a bank switch signal responsive to vertical synchronizing signals outputted at an interval of ⅕th of a second from the SG 134, and supplies it to the memory control circuit 126. The output of vertical synchronizing signals every ⅕th of a second switches the level of a bank switch signal at the interval of ⅕th of a second. The memory control circuit 126 specifies an image bank to be accessed, according to a bank switch signal. That is, the SDRAM 128 has a display image area as shown in FIG. 18 wherein the display image area is formed with image bank 0 and image bank 1. When the bank switch signal is in a low level, the memory control circuit 126 determines as a write destination the image bank 0 and as a read destination the image bank 1. Conversely, when the bank switch signal is high in level, the memory control circuit 126 determines as a write destination the image bank 1 and as a read destination the image bank 0.

Meanwhile, the TG 132 produces a timing signal based on a vertical synchronizing signal and horizontal synchronizing signal outputted from the SG 134, thereby driving the CCD imager 112. As a result, subject camera signals are outputted at an interval of 1/15th of a second from the CCD imager 112. The output camera signals are subjected to well-known noise removal and level adjustment by a CDS/AGC circuit 118 and then converted into camera data as a digital signal by an A/D converter 120. The signal processing circuit 122 performs YUV conversion on the camera data outputted from the A/D converter 120 to produce YUV data. As a result of producing camera signals in frames at an interval of 1/15th of a second, the corresponding YUV data is also created every 1/15th of a second. The signal processing circuit 122 supplies the produced YUV data, together with a write request, to a memory control circuit 126.

The memory control circuit 126, in response to the write request, fetches the YUV data and writes the YUV data onto an image bank specified based upon a bank switch signal. As a result of producing YUV data in frames at an interval of 1/15th of a second and of switching the level of bank switch signal every 1/15th of a second, the YUV data in frames is written alternately onto the image bank 0 and the image bank 1. Incidentally, the YUV data is sent to the memory control circuit 126 via a bus 124a and then written to the SDRAM 128 through a bus 124b.

The YUV data thus written on a desired bank is thereafter read out by the same memory control circuit 126 based on a read request outputted from the video encoder 144. The video encoder 144 generates read request at an interval of 1/30th of a second while the memory control circuit 126 reads repeatedly twice YUV data out of an image bank specified based on a bank switch signal. The YUV data is read out of an image bank not being written and then supplied to the video encoder 144 through the bus 124a. The video encoder 144 converts the input YUV data to an NTSC-formatted composite image signal and supplies the converted composite image signal to a monitor 146. As a result, subject motion images (through-images) are displayed real-time on a monitor screen.

If an operator half-presses a shutter button 158, the system controller 152 supplies corresponding key state data to the CPU 142. Thereupon, the CPU 142 enables an AF control circuit 138 and AE control circuit 140 to provide focus and exposure control. This moves a focus lens 112 to an optimal position and sets the aperture stop 114 to an optimal value. Incidentally, when the shutter button 158 is in a half-pressing state, the CPU 142 also performs a BG (background) mode start-up process, hereinafer stated, and a determining process of successively shot maximum count $N_{MAX}$.

When the shutter button 158 becomes a fully-pressed state, the system controller 152 supplies corresponding key state data to the CPU 142. Thereupon, the CPU disables the bank switch circuit 136 in response to a vertical synchronizing signal, and also disables the signal processing circuit 122 while waiting for creation of YUV data of a subject image taken upon full depression. On the other hand, the video encoder 144, not disabled, continues to supply read requests to the memory control circuit 126. When bank switching is suspended, the memory control circuit reduces the access destinations to only the image bank 0, for example. Due to this, the YUV data outputted from the signal processing circuit 122 is written to the image bank 0 so that the YUV data to be supplied to the video encoder 144 is read out of the image bank 0. As a result, the same ones of YUV data are repeatedly supplied to the video encoder 144, and accordingly, the corresponding still image (freeze image) is displayed on the monitor 146. Note that the YUV data of a subject image taken upon fully pressing the shutter button 158 is defined as original image data, for the explanatory sake.

After securing the original image data in the image bank 0, the CPU 142 instructs the JPEG CODEC 130 to perform a compression process. In response to the compression processing instruction from the CPU 142, the JPEG CODEC 130 requests the memory control circuit 126 to read out the original image data. The original image data is read out of the image bank 0 by the memory control circuit 126, and supplied to the JPEG CODEC 130 via the bus 124a. The JPEG CODEC 130 creates thumb nail image data from the input original image data, and performs a compression process separately on the original image data and the thumbnail image data. This creates original-image compressed data (original compressed data) and thumbnail-image compressed data (thumbnail compressed data).

The JPEG CODEC 130 requests the memory control circuit 126 to write the created compressed data so that the compressed data is written to the SDRAM 128 by the memory control circuit 126. The SDRAM 128 is formed with original and thumbnail image areas, as shown in FIG. 18. The original compressed data and the thumbnail compressed data are respectively written to the original image area and the thumbnail image area. Also, corresponding header data is created by the CPU 142. The memory control circuit 126 is requested to write the created header data. As a result, the header data is written to a header area shown in FIG. 18 by the memory control circuit 126.

After securing 1 frame of original compressed data, thumbnail compressed data and header data in the SDRAM 128, the CPU 142 prepares an instruction list 142a as shown in FIG. 20. The instruction list 142a is to be written by address information and size information of each of the original compressed data, thumbnail compressed data and header data. The data written on the SDRAM 128 is managed according to this instruction list 142a. That is, the instruction list 142a is an administration table to administrate the original compressed data, thumbnail compressed data and header data written in the SDRAM 128.

In concurrent with the writing to the SDRAM 128, the CPU 142 executes a BG mode process to record the original compressed data, thumbnail compressed data and header data stored in the SDRAM 128 onto a memory card 148. At this time, the CPU 142 makes reference to the above instruction list 142a and performs a read process from the SDRAM 128, thereby recording read data to the memory card 148. In the memory card 148, an image file is created accommodating header, a thumbnail image and an original image in the order. In also this case, data reading from the SDRAM 128 is carried out by the memory control circuit 126.

Incidentally, the memory card 148 is unloadable. The memory card 148, when loaded, is in connection to the bus 124 via an interface 147. The CPU 142 writes the data read out by the memory control circuit 126 onto the memory card 148 through the bus 124a and interface 147.

The original image area has a capacity to store 20 frames of original compressed data while each of the thumbnail image area and the header area also has a capacity to store 20 frames of thumbnail or header data. For these of data, writing to the SDRAM 128 and reading from the SDRAM 128 to the memory card 148 are made in a concurrent fashion. When the shutter button 158 is repeatedly fully pushed, original image data, thumbnail image data and header data are cyclically written and read to and from the original image area, thumbnail image area and header area. Incidentally, the CPU 142 performs such processing as estimating a remaining capacity of the memory card 148, calculating a remaining count of exposures based on estimation result, updating display of a remaining count of exposures and so on, in addition to the write process to the SDRAM 128 and recording process onto the memory card 148.

Also, the requests are inputted to the memory control circuit 126 from the signal processing circuit 122, the video encoder 144, the JPEG CODEC 130 and the CPU 142. Consequently, the memory control circuit 126 makes access to the SDRAM 128 while mediating between the requests.

Figure 21:
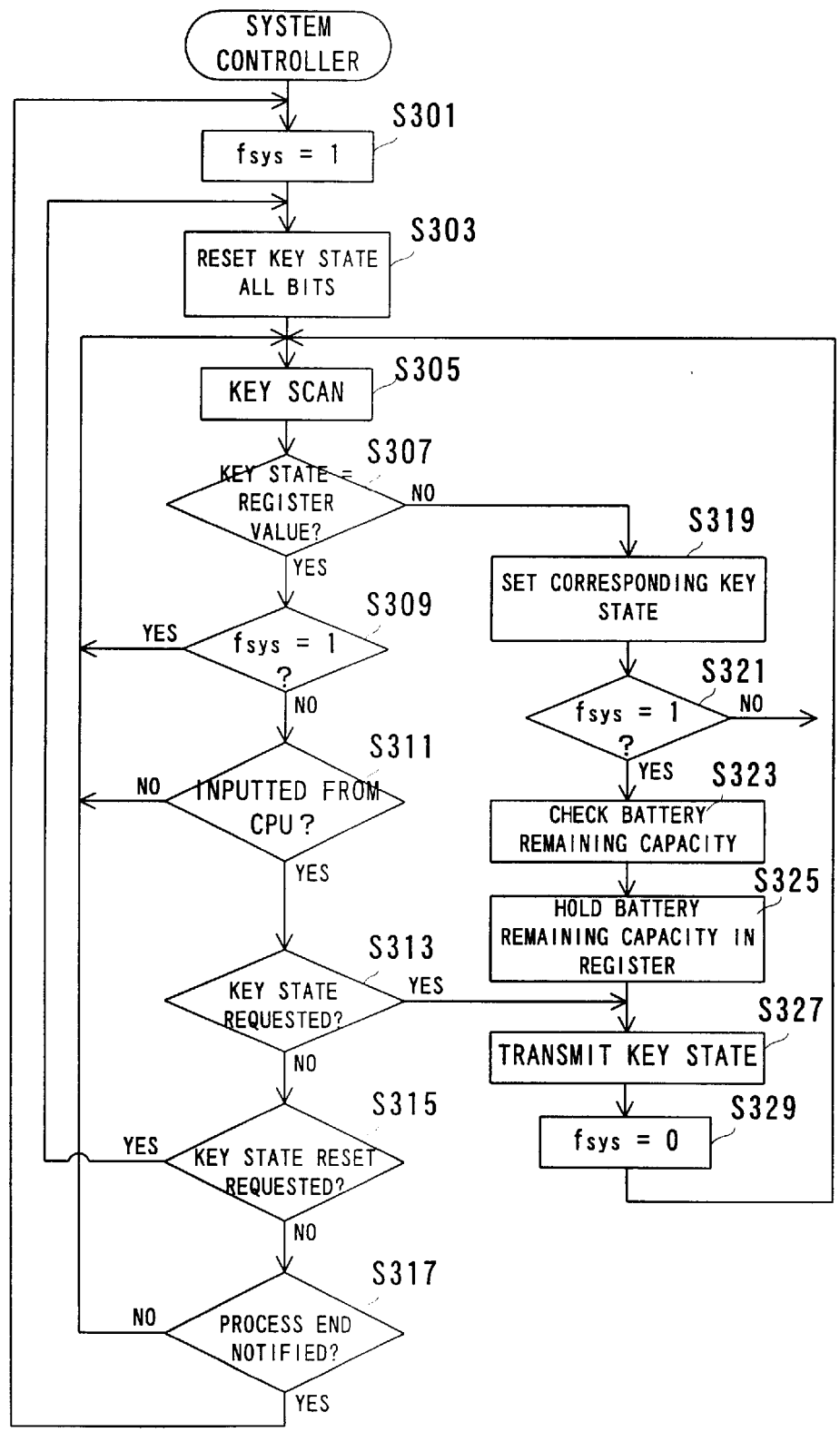
FIG. 21 is a flowchart showing part of operation of the FIG. 17 embodiment.

The system controller 152 concretely processes a flowchart shown in FIG. 21. Meanwhile, the CPU 142 processes concurrently a flowchart shown in FIG. 22 to FIG. 32 and a flowchart shown in FIG. 33 and FIG. 34. That is, the CPU 142 is a multitask CPU mounted with a multitask OS (read time OS) such as $\mu$iTRON, so that it can concurrently perform a write process of FIG. 22 to FIG. 32 and a record process of FIG. 33 and FIG. 34.

Referring first to FIG. 21, explanations will be made on the processing by the system controller 152. The system controller 152 first in step S301 sets a system flag $f_{SYS}$, and in step S303 resets all the bits of a register 152a shown in FIG. 19. The register 152a has a 0th bit representative of whether the shutter button 158 is in a half-pressed state or not, 1st bit representative of whether the shutter button 158 is in a fully-pressed state, 2nd bit representative of whether a camera mode has been selected, and 3rd bit representative of whether a reproduce mode has been selected. The system controller 152 sets the register 152a in an initial state.

The system controller 152 subsequently advances to step S303 to detect states of the shutter button 158 and mode change switch 160. It is determined in step S307 whether a state of the key agrees with a value represented by the register 152a or not. Note that, because a mode set switch 160 is set to any one of "camera" and "reproduce" side, "NO" is determined in step S307 immediately after turning on the power.

When determined "NO" in step S307, the system controller 152 advances to the step S319 to set a corresponding bit of the register 152a. For example, if a camera mode has been selected, the system controller 152 puts the register 152a 2nd bit to "1". Then, it is determined in step S321 whether the system flag $f_{SYS}$ has been set or not. If "NO", the process returns to step S305 while if "YES" the process advances to step S323. In step S323 a remaining capacity of a battery 154 is detected, and in step S325 the detected remaining capacity data is stored in a register 156. Subsequently, in step S327 the key state data stored in the register 152a is sent to the CPU 142, and in step S329, the system flag $f_{SYS}$ is reset and the process returns to the step S305.

If determined "YES" in step S307, the CPU 142 advances to step S309 to determine a state of the system flag $f_{SYS}$. If the system flag $f_{SYS}$ is in a set state, the process returns to step S305. However, if the system flag $f_{SYS}$ is in a reset state, it is determined in step S311 whether there is any input from the CPU 142 or not. If "NO" here, the process returns to step S305 similarly to the above. However, if "YES", the input signal is determined in its content in steps S313, S315 and S317.

If the input signal is a request to transmit key state data, the system controller 152. in step S313 determines "YES" and in step S327 sends the key state data stored in the register 152a to the CPU 142. Then, the process after resetting the system flag $f_{SYS}$ in step S329 returns to step S305. If the input signal is a request to reset a key state, the system controller 152 in step S315 determines "YES" and process returns to step S303. If the input signal is on a notification of process end, the system controller 152 in step S317 determines "YES" and the process returns to step S301. Incidentally, if "NO" in step S317, the system controller 152 returns to step S303.

The system flag $f_{SYS}$ set state represents that the system controller 52 possesses an initiative while the reset state shows that the CPU 142 has an initiative. Because the system flag $f_{SYS}$ is set in step S301, the system controller 152 immediately after power turning on takes an initiative to send, in step S327, current key state data to the CPU 142. The system flag $f_{SYS}$ is reset after sending the key state data whereby the initiative is taken over to the CPU 142.

During transferring the initiative to the CPU 142, the system controller 152 performs key scan at predetermined timing and, if there is a change, updates the register 152a state data. If there is no change in the key state, the system controller 152 waits for an input from the CPU 142. When given a request to send key state data, the system controller 152 sends the current key state data. Consequently, the key operations while the CPU is performing a predetermined process, become effective each time a key state data sending request is given. The key state data to be sent corresponds to a key state upon inputting the sending request.

If a process ending notification is outputted from the CPU 142, the system controller 152 sets a system flag $f_{SYS}$ and gets an initiative again. However, because the register 152a is reset immediately after setting the system flag $f_{SYS}$, the shutter operations made hereinafter are effective.

Now, explanations will be made on the CPU 142 processing with reference to FIG. 22. The CPU 142 first in step S331 processes a subroutine shown in FIG. 27. Specifically, in step S441 a BG flag $f_{BG}$ is reset. Next, in step S443 a write address $V_{WA}$ and read address $V_{RA}$ of original compressed data is set to a start address $V_{SA}$ of the original image area shown in FIG. 18, a write address $S_{WA}$ and read address $S_{RA}$ of thumbnail compressed data is set to a start address $S_{SA}$ of the thumbnail image area, and a write address $H_{WA}$ and read address $H_{RA}$ of header data is set to a start address $H_{SA}$ of the header area. Furthermore, in step S445 reset is a time data $R_{TIME}$ representing a time of fully depressing the shutter button 158. Subsequently, in step S447 detected is a memory capacity of the memory card 148, and in step S449 calculated is the number of images recordable on the memory card 148 according to Equation 10.

$$\gamma : REM_{SIZE} / F_{MAXSIZE} \tag{10}$$

Figure 22:
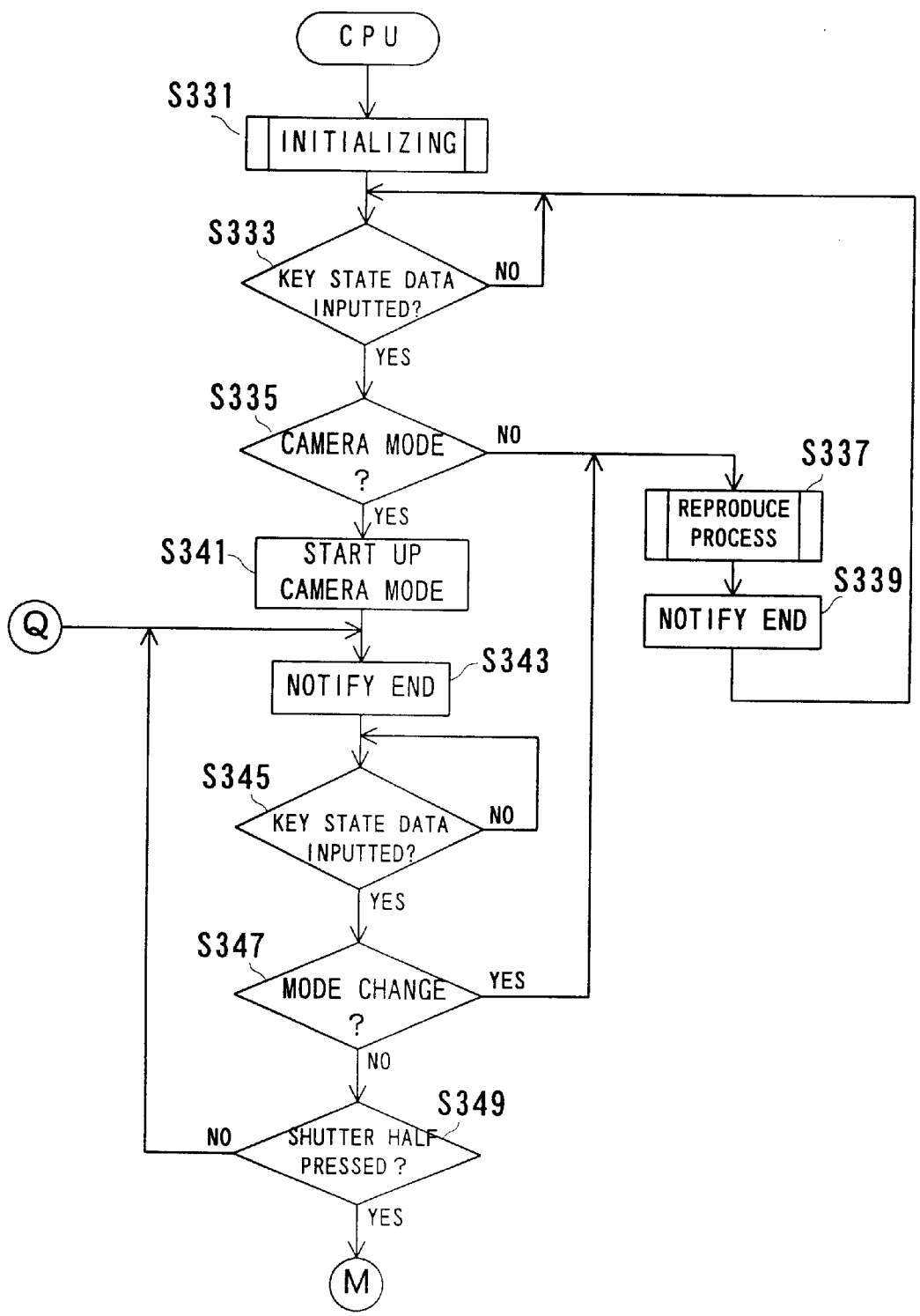
FIG. 22 is a flowchart showing another part of the operation of the FIG. 17 embodiment.
Figure 23:
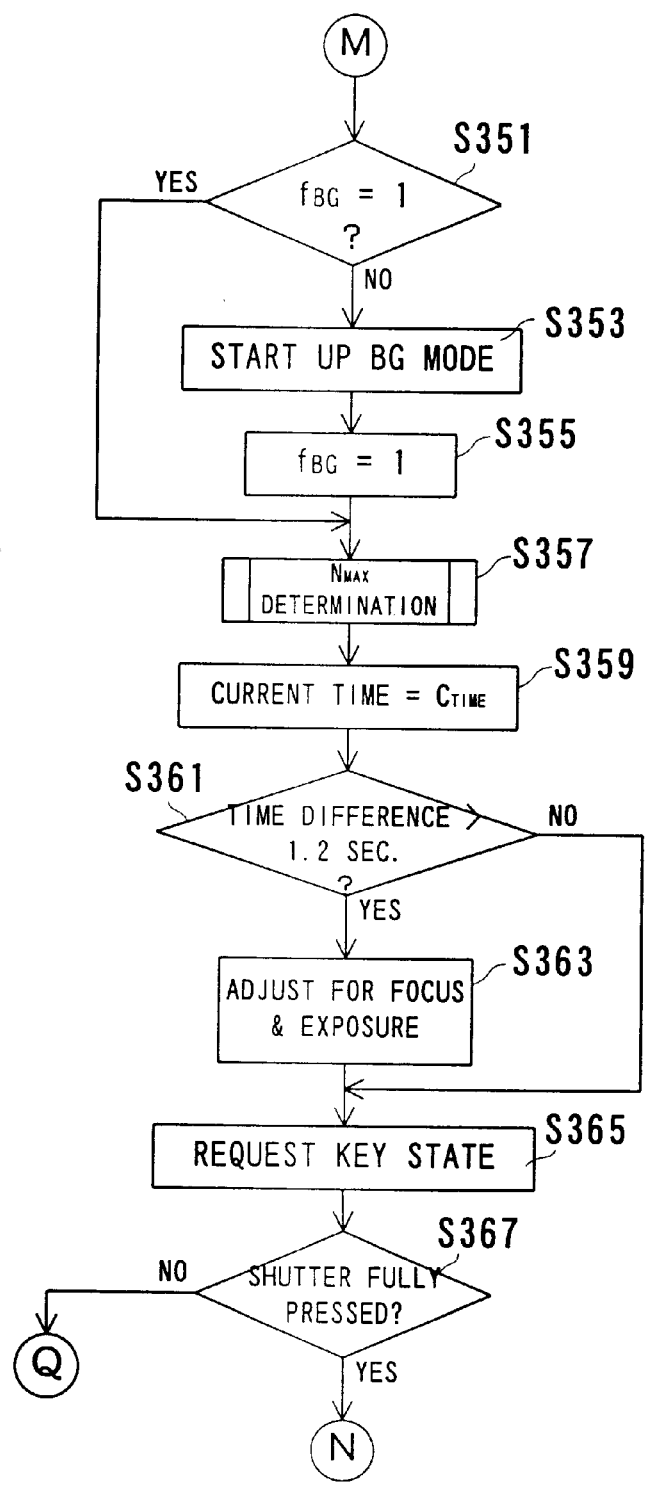
FIG. 23 is a flowchart showing still another part of the operation of the FIG. 17 embodiment.
Figure 24:
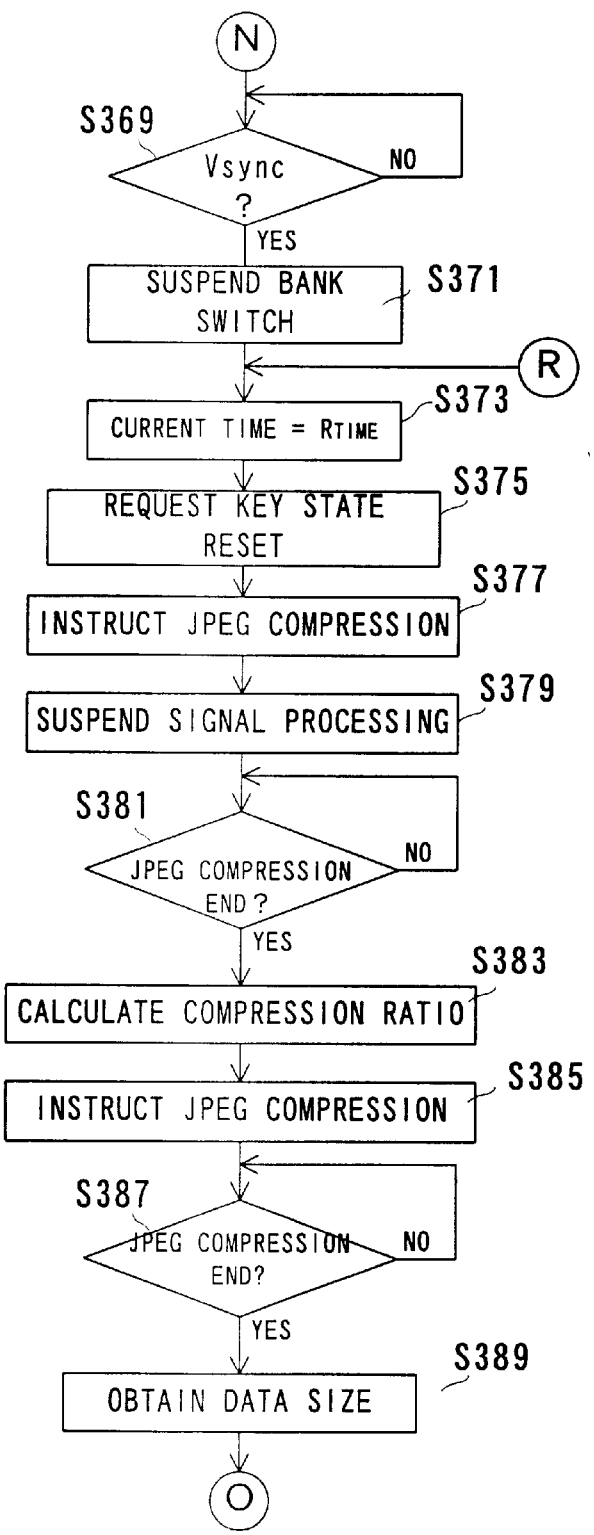
FIG. 24 is a flowchart showing yet another part of the operation of the FIG. 17 embodiment.

$\gamma$: remaining count of exposures
$REM_{SIZE}$: remaining capacity
$F_{MAXSIZE}$: image file maximum size The CPU 42 thereafter OSD-displays a character of a calculated remaining count of exposures on the monitor 146, and the process returns to step S331 of FIG. 22. Incidentally, the character of the remaining count can be displayed by controlling a character generator, not shown.

The CPU 142 subsequently in step S333 determines whether key state data was inputted from the system controller 152 or not. If "YES" here, the process advances to step S335 to determine from the key state data whether the mode selected by the operator is either of a camera mode or a reproduce mode. If a desired mode is a reproduce mode, "NO" is determined in step S335 to execute a reproduce process in step S337. After ending the process, the CPU in step S339 outputs an end notification to the system controller 142, and the process returns to step S333.

On the other hand, where a desired mode is a camera mode, the CPU 142 in step S341 starts up for a camera mode. That is, the signal processing block and encode block mentioned before are started up. As a result, a through-image of a subject is displayed on the monitor 146. The CPU 142 thereafter in step S343 outputs an end notification to the system controller 152, and in step S345 waits for input of key state data.

If key state data is inputted from the system controller 152, the CPU 142 in respective steps S347 and S349 determines whether operator's key operation is for mode change or not and whether the shutter button 158 was half-pressed or not. If the key operation is for mode change, the CPU 142 advances from step S347 to step S337, and if the key operation is half-pressing the shutter button 158, the process advances from step S349 to step S351.

Incidentally, the digital camera 100 is provided also with a cursor key (not shown) having no bearing on the camera mode, and the register 152a also holds corresponding bit data to the cursor key. Where the key state data input is based on cursor key operation, the CPU 142 returns from step S349 to step S343.

In step S351 it is determined whether the BG flag $f_{BG}$ has been set or not. Because the BG flag $f_{BG}$ has reset in the above step S441, "NO" is determined in first-round step S351. Thereupon, the CPU 142 in step S353 starts up a BG mode and in step S355 sets the BG flag $f_{BG}$, and the process proceeds to step S357. If "YES" is determines in step S351, the CPU 142 directly advances to step S357.

Figure 28:
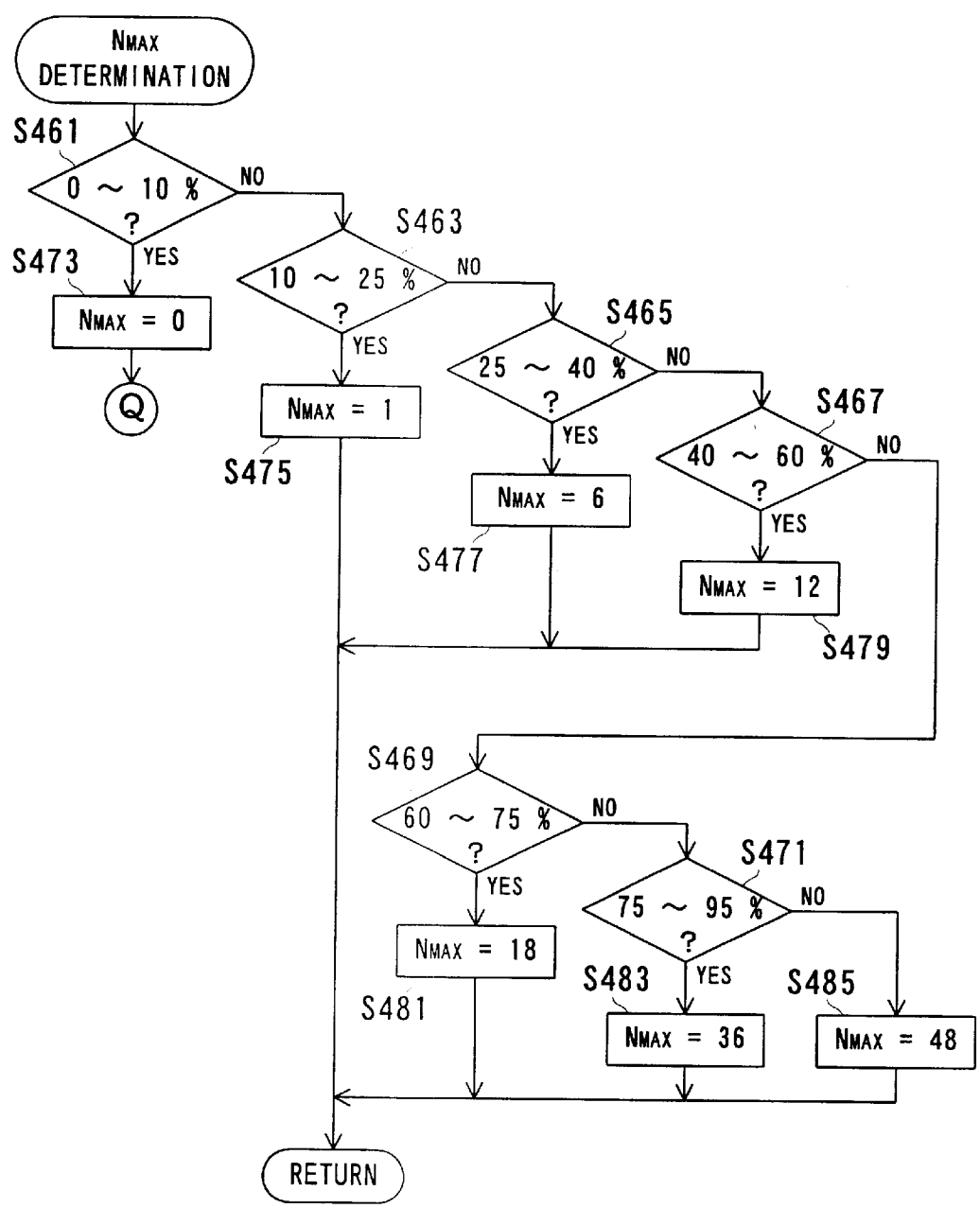
FIG. 28 is a flowchart showing another part of the operation of the FIG. 17 embodiment.

In step S357 a successive-shot maximum number $N_{MAX}$ is determined by a subroutine shown in FIG. 28. That is, it is determined in steps S461–S471 at what percentage the remaining capacity of the battery 154 is of the full capacity. The determination uses the battery remaining capacity data held in the register 156. If the remaining capacity is 0%, in step S473 determination is made as maximum number $N_{MAX}=0$ and the process returns to step S343. If the remaining capacity is 10%–25%, in step S475 determined is maximum number $N_{MAX}=1$. If the remaining capacity is 25%–40%, in step S477 maximum number $N_{MAX}=6$. If the remaining capacity is 40%–60%, in step S479 determined is maximum number $N_{MAX}=12$. If the remaining capacity is 60%–75%, in step S481 determined is maximum number $N_{MAX}=18$. If the remaining capacity is 75%–95%, in step S483 determined is maximum number $N_{MAX}=36$. If the remaining capacity is 95%–100%, in step S485 determined is maximum number $N_{MAX}=48$. When the process passes any process of steps S475–S485, the CPU 142 returns to step S357 of FIG. 23.

The CPU 142 subsequently proceeds to step S359 to set a current time detected by a timepiece circuit 150 to time data $C_{TIME}$. In step S361 calculated is a time difference "$R_{TIME}-C_{TIME}$" between the time data $C_{TIME}$ and the time data $R_{TIME}$, to determine whether a calculated time difference exceeds 1.2 seconds or not. If "NO" here, the process directly proceeds to step S365. However if "YES", in step S363 focussing and aperture stop are controlled and then the process advances to step S365. "$R_{TIME}-C_{TIME}$" signifies a difference between a time upon fully pressing the shutter button 158 in the preceding time and a time upon half-pressing thereafter the shutter button 158. If this time difference is small, there is no significant change in the subject and accordingly there is less necessity of readjusting focussing and exposure. Due to this, the process of step S363 is to be skipped over depending upon such a time difference.

In step S365 the system controller 152 is requested to send key state data. If key state data is inputted responsive thereto, the CPU 142 determines based on the data whether the shutter button 158 has been fully pressed or not. Where the operator has continued to half-press the shutter button 158 or releases his or her finger from the shutter button 158 after half-pressing, the CPU 142 in this step determines "NO" and the process returns to step S343.

On the other hand, if the operator changes from a half-pressing to fully-pressing state of the shutter button 158, the CPU 142 executes a process of step S369 and the subsequent to record a subject image upon fully pressing on the memory card 148. Specifically, it is first determined in step S369 whether a vertical synchronizing signal was inputted or not. If an "YES" determination result is obtained, in step S371 bank switching is stopped. The stopping of bank switching in response to a vertical synchronizing signal specifies, at optimal timing, an image bank to be effective when outputting a freeze image. The CPU 142 in step S373 detects a current time, or a time of fully pressing, from the timepiece circuit 150 to thereby set a detected time to the time data $R_{TIME}$. Subsequently, in step S375 the system controller 152 is requested to reset the key state data.

In step S377 the JPEG CODEC 130 is instructed to perform image compression according to an initial compressed ratio, and in the succeeding step S379 the signal processing circuit 122 is disabled at a time that original image data has been stored to the image bank 0 of the SDRAM 128. The processing of step S379 signifies to continuously enable the signal processing circuit 122 until original image data has been produced. Where the shutter button 158 is fully pressed, there arises a necessity of performing a process such as compression on the corresponding YUV data wherein however the YUV data obtainable thereafter is unnecessary. Consequently, the signal processing circuit 122 is kept enabled only in a predetermined time period after obtaining a determination result of fully pressing, and the signal processing circuit 122 is disabled at a time that original image data has been obtained.

The JPEG CODEC 130, in response to the image compression command, requests the memory control circuit 126 to read out the original image data. Due to this, the original image data is read out of the image bank 0 by the memory control circuit 126 and delivered to the JPEG CODEC 130. The JPEG CODEC 130 compresses the original image data with an initial compression ratio. After ending the compression, the JPEG CODEC 130 supplies a data size of the original compressed data and compressed end signal to the CPU 142.

Inputted by the end signal, the CPU 142 in step S381 determines "YES". Thereupon, the CPU 142 in step S383 calculates an optimal compression ratio based on the above data size and initial compression ratio. This optimal compression ratio is a compression ratio that can reduce the original compressed data down to a predetermined data size (recordable maximum size) or smaller.

In step S385 the JPEG CODEC 130 is instructed to perform compression with the optimal compression ratio thus obtained and writes the compressed data to the SDRAM 128. At this time, the CPU 142 supplies the optimal compression ratio as well as the above-mentioned write addresses $V_{WA}$ and $S_{WA}$ to the JPEG CODEC 130.

The JPEG CODEC 130 compresses the original image data with the optimal compression ratio to produce original compressed data. The JPEG CODEC 130 also produces thumbnail image data from the original image data. The thumbnail image data is also compressed with the optimal compression ratio. A request of writing the compressed data, together with the write addresses $V_{WA}$ and $S_{WA}$, are supplied to the memory control circuit 126. As a result, the original compressed data is written in and following the write address $V_{WA}$ in the original image area while the thumbnail compressed data is written in after the write address $S_{WA}$ in the thumbnail image area.

The JPEG CODEC 130, when ending the compressed process, supplies to the CPU 142 an end signal as well as an original compressed data size $V_{SIZE}$ and thumbnail compressed data size $S_{SIZE}$. The CPU 142, when given the end signal, determines "YES" in step S387 and in the succeeding step S389 acquires the above data sizes $V_{SIZE}$ and $S_{SIZE}$. In step S391 the write addresses $V_{WA}$ and $S_{WA}$ are updated according to equation 11.

$$V_{WA}=V_{WA}+V_{SIZE}$$
$$S_{WA}=S_{WA}+S_{SIZE} \qquad (11)$$

Due to this, the original compressed data and thumbnail compressed data based on fully pressing the shutter button 158 in a next time will be respectively written following the current original compressed data and current thumbnail compressed data.

The CPU 142 then advances to step S393 to create corresponding header data to the current original compressed data and current thumbnail compressed data. In step S395 a request of writing the header data is supplied, together with a write address $H_{WA}$ to the memory control circuit 126. The memory control circuit 126 writes the input header data in and following the write address $H_{WA}$ of the SDRAM 128. After outputting the write request in step S395, the CPU 142 in step S397 updates the write address $H_{WA}$ according to Equation 12.

$$H_{WA}=H_{WA}+H_{SIZE} \qquad (12)$$

As a result, the header data to be produced based upon a next fully-pressing operation will be stored following the current header data.

If there is no vacant area that is greater than the recordable maximum size in a position of and following the write address $V_{WA}$ having been updated according to Equation 11, it is impossible to write original compressed data to be obtained by the next fully pressing to a position following the original image area. Consequently, the CPU 142 in step S399 determines whether a condition of Equation 13 is satisfied or not.

$$V_{WA}+V_{MAXSIZE}>V_{EA}$$

$V_{MAXSIZE}$: the recordable maximum size of original compressed data
$V_{EA}$: the last address of original image area If this condition is satisfied, it is possible to write next original compressed data in and following the current write address $V_{WA}$ continuously. In this case, the CPU 142 directly advances to step S403. On the other hand, if the condition of Equation 13 is not fulfilled, in step S401 the write addresses $V_{WA}$, $S_{WA}$ and $H_{WA}$ are set at start addresses $V_{SA}$, $S_{SA}$ and $H_{SA}$, and then the process proceeds to step S403. As a result, continuity is assured for each of the original compressed data, thumbnail compressed data and header data. Also, the mutually-related original compressed data, thumbnail compressed data and header data are updated in write position in a same procedure and cyclic fashion.

Figure 29:
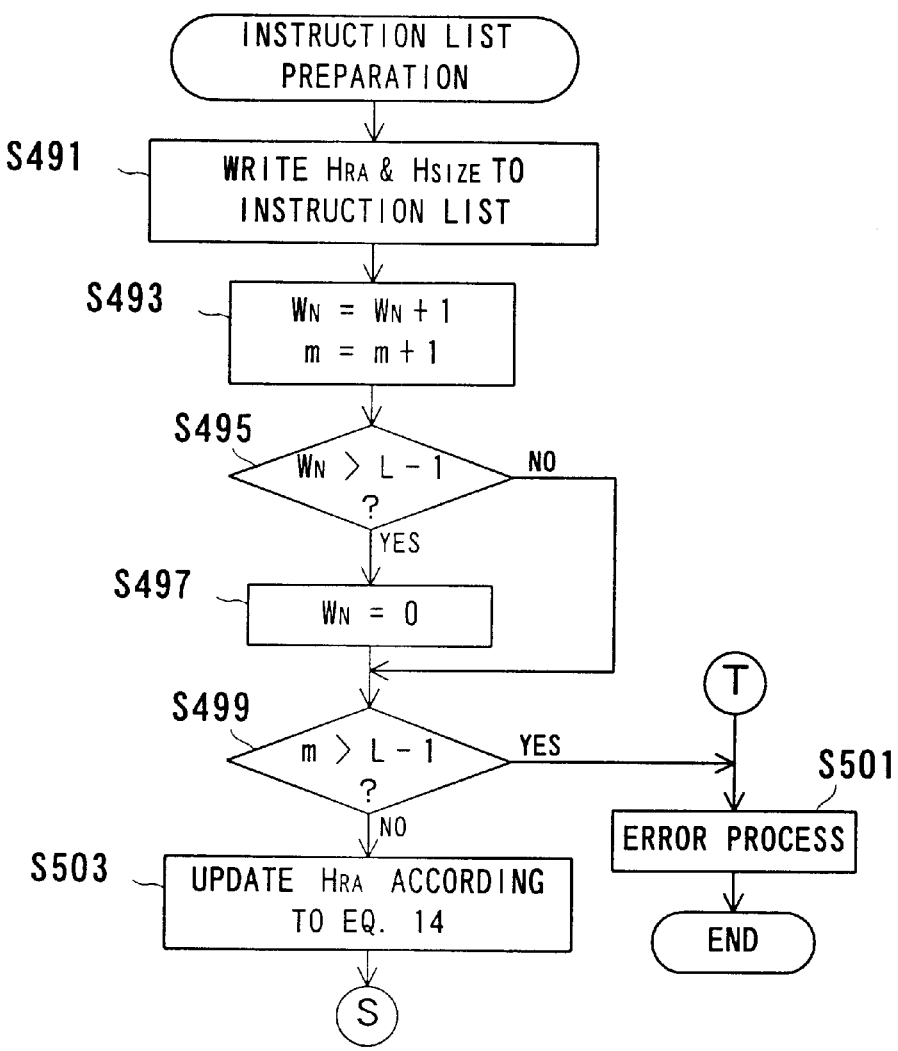
FIG. 29 is a flowchart showing still another part of the operation of the FIG. 17 embodiment.
Figure 30:
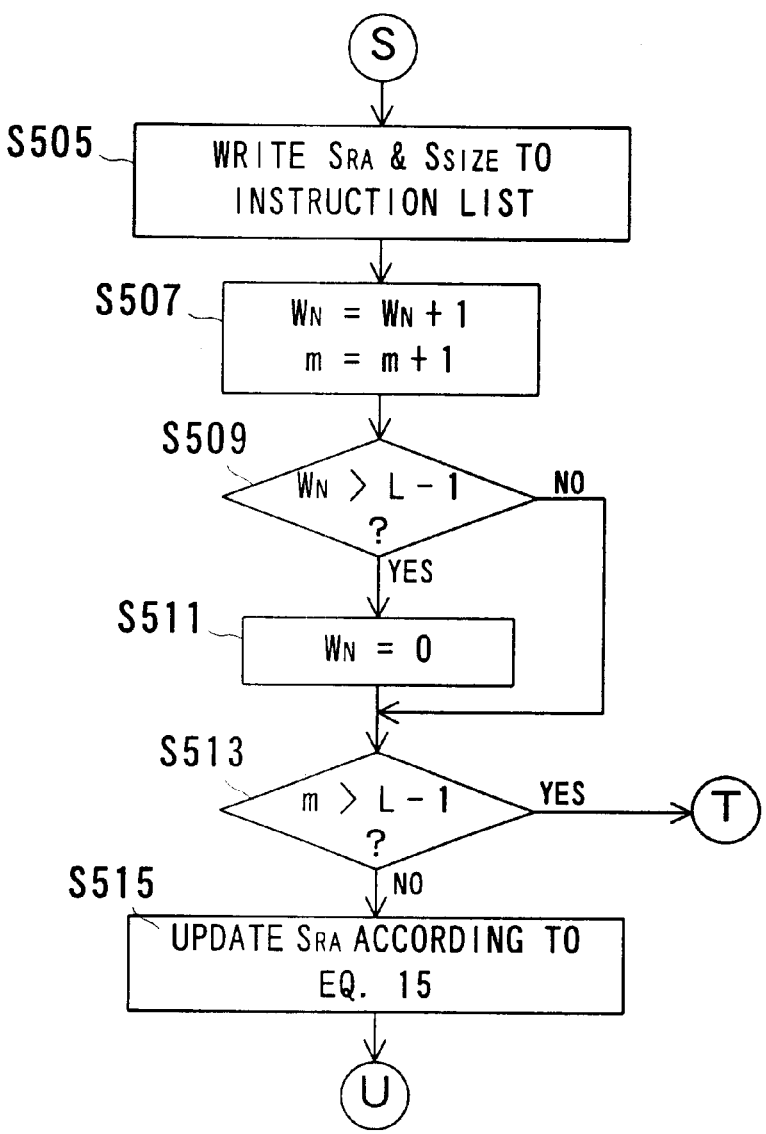
FIG. 30 is a flowchart showing yet another part of the operation of the FIG. 17 embodiment.
Figure 31:
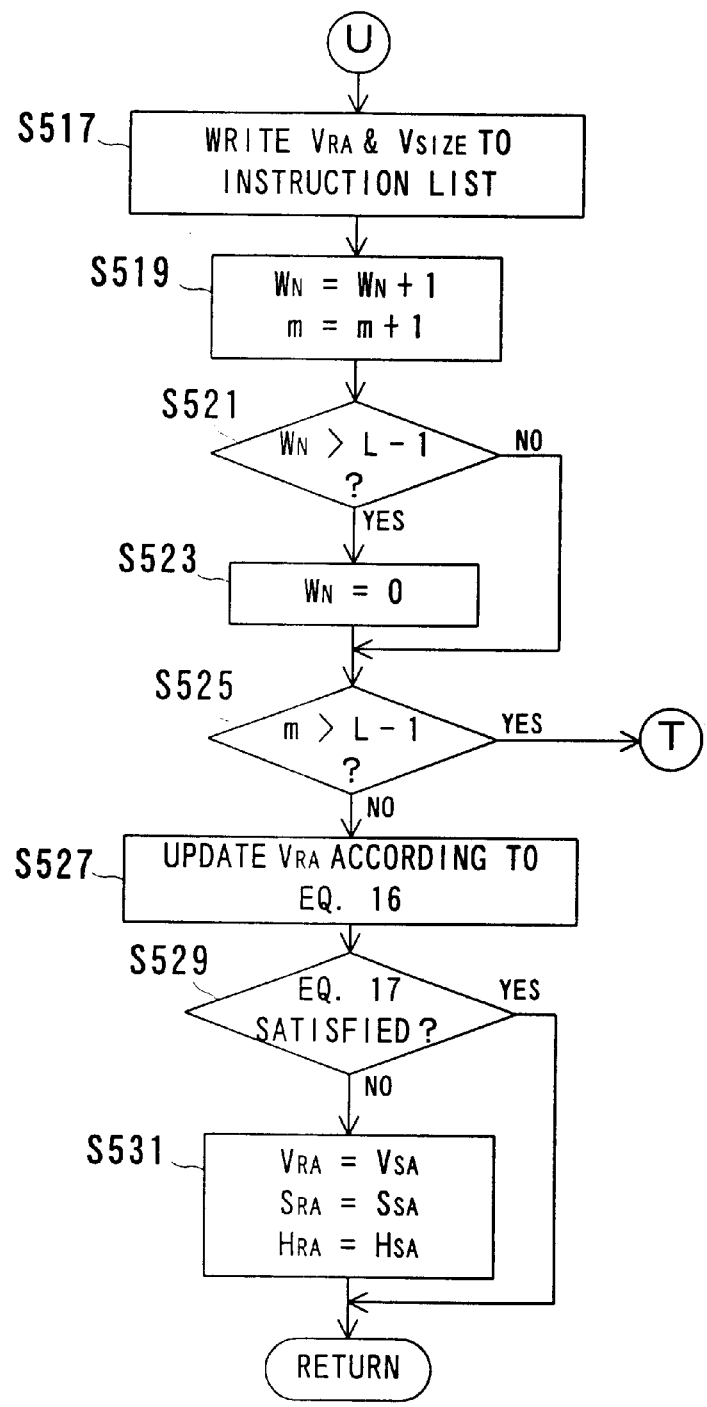
FIG. 31 is a flowchart showing another part of the operation of the FIG. 17 embodiment.

In step S403 a subroutine shown in FIG. 29 to FIG. 31 is processed to prepare an instruction list 142a shown in FIG. 20. The CPU 142 first in step S491 writes a header data read address $H_{RA}$ and header data size $H_{SIZE}$ to the instruction list 142a of FIG. 20. Specifically, a mail no. is detected that has a same value as a mail write number $W_N$, to write the read address $H_{RA}$ and data size $H_{SIZE}$ into a corresponding position to the detected mail no. The mail write no. $W_N$ is reset in step S551 shown in FIG. 33. The read address $H_{RA}$ is initialized in step S443 shown in FIG. 27. The data size $H_{SIZE}$ is previously determined. Due to this, in first-round step S491, the read address $H_{RA}(=H_{SA})$ and predetermined data size $H_{SIZE}$ are written into a corresponding position to $W_N=0$.

The CPU 142 then in step S493 increments the mail write no. $W_N$ and count value m, and in step S495 compares the current write no. $W_N$ with a mail no. maximum value "L−1". "L−1" is, for example, "1999". If $W_N \leq L-1$ herein, the process directly advances to step S499. However, if $W_N>L-1$, in step S497 the mail write no. $W_N$ is reset and then the process proceeds to step S499.

In step S499 the count value m is compared with "L−1". The count value m represents the number of addresses not yet processed in the instruction list 142a, meaning an amount of data having been written in SDRAM 128 but not yet read out. Such a count value m usually satisfies a condition $m \leq L-1$, and is determined "YES" in step S499. At this time, CPU 142 in step S503 updates the read address $H_{RA}$ according to equation 14, and then the process proceeds to step S505.

$$H_{RA}=H_{RA}+H_{SIZE} \qquad (14)$$

Incidentally, m>L−1 will be given in the case that the increment rate of count value m greatly exceeds the decrement rate thereof due to abnormally-slow BG mode processing, which provides a determination "YES" in step S499. At this time, the CPU 142 in step S501 performs an error process thus forcibly ending the write process.

In step S505 the thumbnail compressed data read address $S_{RA}$ and thumbnail compressed data size $S_{SIZE}$ are written by being put in correspondence to the mail write no. $W_N$ in the instruction list 142a. The CPU 142 subsequently in step S507–S513 performs a similar process to that of the steps S493–S499. If "YES" in step S513, the process moves to step S501 while if "NO" then in step S515 the read address $S_{RA}$ is updated according to Equation 15.

$$S_{RA}=S_{RA}+S_{SIZE} \qquad (15)$$

The CPU 142 then proceeds to step S517 to write the original compressed data read address $V_{RA}$ and original compressed data size $V_{SIZE}$ into the instruction list 142a in a corresponding position to the mail write no. $W_N$. In steps S119–S525 a similar process is performed to that of steps S493–S499. If determined "NO" in step S525, the CPU 142 in step S527 updates the read address $V_{RA}$ according to Equation 16.

$$V_{RA}=V_{RA}+V_{SIZE} \qquad (16)$$

In this manner, the address and size information of the mutually-related header data, thumbnail compressed data and original compressed data are written, in the order, to the instruction list 142a. The CPU 142 thereafter advances to step S529 to determine whether the condition of Equation 17 is satisfied or not, because of the same reason as in the above step S399.

$$V_{RA} + V_{MAXSIZE} > V_{EA} \quad (17)$$

Figure 25:
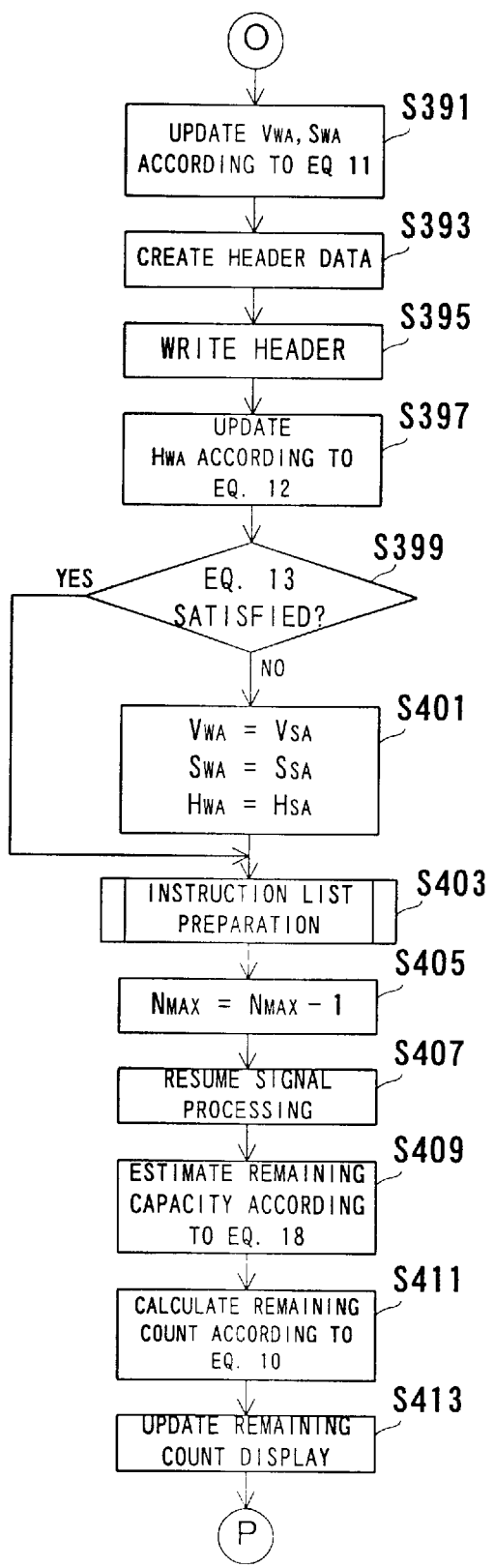
FIG. 25 is a flowchart showing another part of the operation of the FIG. 17 embodiment.

If "YES", the process directly returns to step S403 shown in FIG. 25. However, if "NO", in step S531 the read addresses $V_{RA}$, $S_{RA}$ and $H_{RA}$ are set to start addresses $V_{SA}$, $S_{SA}$ and $H_{SA}$, and then the process returns to step S403.

In step S405 the successively-shot maximum number $N_{MAX}$ is decremented and in the succeeding step S407 the signal processing circuit 122 is enabled. As a result, a through-image is displayed on the monitor 146. Note that the bank switching is still suspended and the YUV data is written to and read from the image bank 0.

The CPU 142 subsequently in step S409 arithmetically operates Equation 18 to estimate a remaining capacity of the memory card 148. That is, the data size $S_{SIZE}$ and $V_{SIZE}$, predetermined data size $H_{SIZE}$ and cluster size $C_{SIZE}$ are subtracted from the remaining capacity $REM_{SIZE}$. Incidentally, the image files are recorded according to an FAT (File Allocation Table) scheme in the memory card 148 wherein a corresponding capacity to a cluster size $C_{SIZE}$ is consumed each time one image file is recorded. Due to this, the cluster size $C_{SIZE}$ is taken into account in the arithmetic calculation of Equation 18.

$$REM_{SIZE} = REM_{SIZE} - (H_{SIZE} + S_{SIZE} + V_{SIZE} + C_{SIZE}) \quad (18)$$

$C_{SIZE}$: cluster size

The CPU 142 also in step S411 arithmetically operates the above Equation 10 to calculate a remaining count of exposures based on a remaining capacity estimation value obtained by Equation 18. After calculating a remaining count of exposures, the CPU 142 advances step S413 to update the remaining count of exposures to be displayed on the monitor 146.

Figure 32:
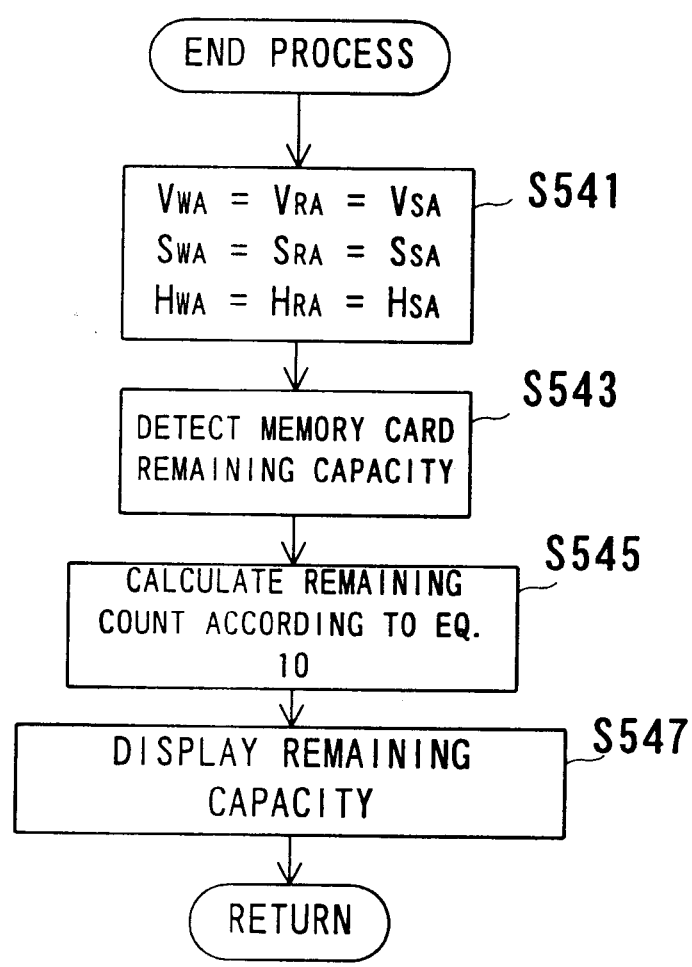
FIG. 32 is a flowchart showing still another part of the operation of the FIG. 17 embodiment.

In the subsequent step S415 it is determined whether the remaining count of exposures thus calculated is greater than "1" or not. If remaining count$\leq$1, the CPU 142 determines "NO" and in step S427 resets a BG flag $S_{BG}$. Furthermore, it is determined in step S429 whether the BG mode process shown in FIG. 33 and FIG. 34 has been ended or not. If a determination result "YES" is obtained, the process proceeds to step S431. In this step a subroutine is processed that is shown in FIG. 32. First, in step S541 a write address $V_{WA}$ and read address $V_{RA}$ are set to a start address $V_{SA}$, and write address $S_{WA}$ and read address $S_{RA}$ are set to a start address $S_{SA}$, and a write address $H_{WA}$ and read address $H_{RA}$ is set to a start address $H_{SA}$. Next, in step S543 the memory card 148 is actually accessed in order to detect a remaining capacity. Furthermore, in step S545 a remaining count of exposures is calculated according to the above Equation 10, and in step S547 this remaining count of exposures is displayed on the monitor 146. Then, the process returns to step S43 of FIG. 26. The CPU 142 thereafter in step S433 determines whether a vertical synchronizing signal has been inputted or not. If a determination result "YES" is obtained, in step S435 a bank switch operation is resumed and then the process returns to step S343.

As a result, if remaining count$\leq$1, the process of step S3429 is repeated thus substantially executing the BG mode process only. If, due to this, all the data stored in the original image area, thumbnail image area and header area has been recorded onto the memory card 148, a bank switching is resumed thus making shutter button 158 operation effective.

On the other hand, if remaining count of exposures>1 is determined in step S415, the CPU 142 in step S417 compares the count value m with a predetermined value $m_A$(=50), and in step S419 compares the count value m with a predetermined value $m_B$(=55). As stated before, the count value m represents the number of addresses not yet processed in the instruction list 142a and is related to an amount of data having not been read out of the SDRAM 128. The original image area, thumbnail image area and header area each have only a capacity corresponding to 20 frames of data, and a count value m=60 means that these areas are in full. Due to this, the count value m is evaluated, i.e. the count value m is compared with the predetermined values $m_A$ and $m_B$, to change a processing way depending upon a comparison result.

Specifically, if m>55, the remaining capacity of the SDRAM 128 is slight. At this time, the CPU 142 in step S419 determines "YES" and the process moves to step S427. As a result, the BG mode process completes thus suspending the write process until bank switch operation is resumed. If 50<m$\leq$55, the situation is not so imminent as requiring sweep-away of the SDRAM 128 data although the remaining capacity of the SDRAM 128 is not necessarily sufficient. At this time, the CPU 142 moves to step S433 to resume bank switching, and then the process returns to step S343. Because bank switching is resumed in response to a vertical synchronizing signal, the write process is suspended during a time of waiting for a vertical synchronizing signal input. The BG mode process is executed in an exclusive fashion. As a result, the remaining capacity of SDRAM 128 is enlarged.

If m$\leq m_A$, the CPU 142 determines that there is a sufficient remaining capacity in the SDRAM 128, and in step S421 compares the maximum count of exposures $N_{MAX\ with}$ "0". If $N_{MAX}$>0 herein, there is a room left for successive shots. At this time, the CPU 142 in step S423 requests the system controller 152 to transmit key state data, and in step S425 determines from the key state data whether the shutter button 158 has been fully pressed or not. If "YES", the process returns to step S373. That is, if the shutter button 158 has been fully pressed at a time that in step S423 a request is issued to the system controller 152, the CPU determines that the operator desires to take a picture with rapid timing, and the process returns to step S373 instead of to step S343. If the shutter button 158 has not been fully pressed even with $N_{MAX}\leq$0 or $N_{MAX}$>0, the CPU 142 moves to step S433. The CPU 142 after resuming bank switching returns to step S343.

The process flow differs as follows depending upon timing of shutter button 158 operation. It actually takes about 0.8 second for the process to advance from step S367 to step S425. If shutter button 158 is fully pressed at a time interval of around that, the process of steps S343–S371 is skipped over. Accordingly, if the shutter button 158 is fully pressed at an interval of 0.8 second, the process of steps S373 and the subsequent is repeated. On the contrary, if half pressing is made within a time of 1.2 second after full pressing and further it has elapsed 0.8 second or longer between the full pressing of after the half pressing and the last-time full pressing, only the process of step S363 is skipped over. If it takes 1.2 seconds or longer between full pressing and the half pressing, step S363 is executed.

Figure 33:
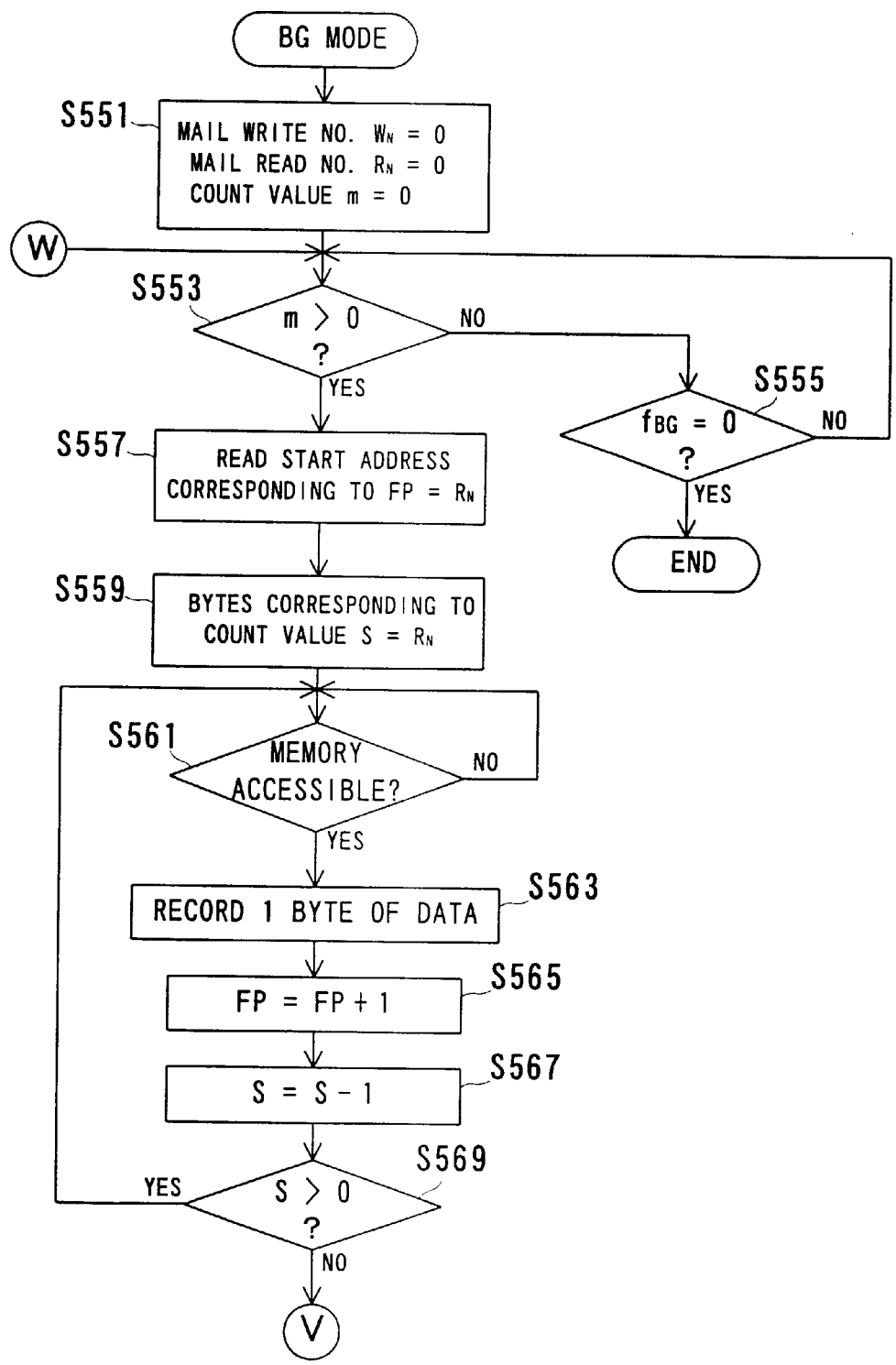
FIG. 33 is a flowchart showing yet another part of the operation of the FIG. 17 embodiment.
Figure 34:
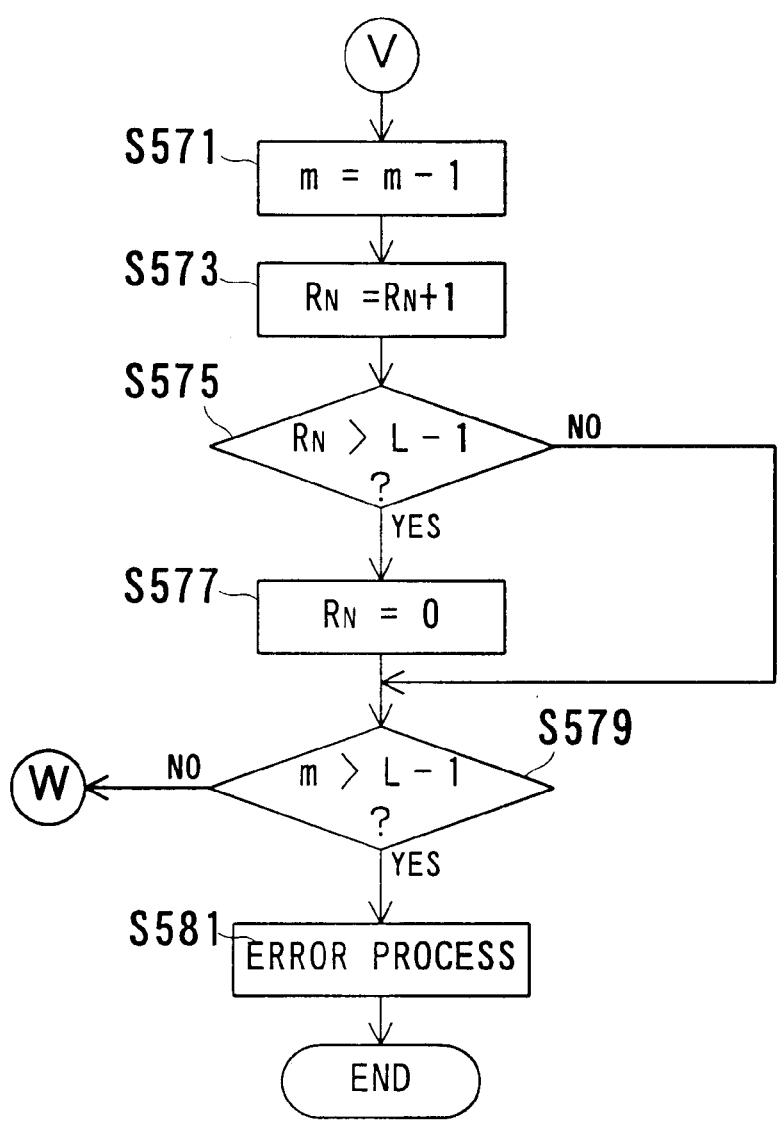
FIG. 34 is a flowchart showing another part of the operation of the FIG. 17 embodiment.

Explanations will be made on the BG mode process with reference to FIG. 33. The CPU 142 first in step S551 resets a mail write no. $W_N$, mail read no., $R_N$ and count value m. Next, it is determined in steps S553 and S555 whether the count value m is greater than "0" or not and whether a BG flag $f_{BG}$ has been reset or not. If m>0, the process from step S553 to step S557. If m≦0 and the BG flag $f_{BG}$ is in a set state, the process returns to step S553. If m≦0 and BG flag $f_{BG}$ is in a reset state, the process is ended.

Although the count value m is reset in step S551, it is incremented by an instruction list preparation process in step S403. This provide m>0 and hence "YES" determination in step S553. Thereupon, the CPU 142 in step S557 sets a file pointer FP to a corresponding read start address to the mail read no. $R_N$ and a count value S to a corresponding data size to the mail read no. $R_N$. In the above step S403, an instruction list 142a is prepared that is as shown in FIG. 20. According to FIG. 20, a read start address and a data size expressed in bytes are put in correspondence to a mail no. In steps S557 and S559, a mail no. is detected that has a same value as a current mail read no. $R_N$, and a read start address and data size are read out that are correspond to the detected mail no. The read-out address data and size data are respectively set to the file pointer FP and the count value S.

The CPU 142 subsequently in step S561 determines whether the SDRAM 128 is accessible to or not. While a time period shutter button 158 is being pressed, the memory control circuit 126 receives requests from a plurality of circuits and gets access to the SDRAM 128 while mediating between these requests. Due to this, in step S561 a read request is outputted, together with address data possessed by the file pointer FP, to the memory control circuit 126. The memory control circuit 126, when processing such a read request, first outputs a permission signal to the CPU 142 and then reads 1 byte of data out of the SDRAM 128 according to the address data of the file pointer FP. The read 1-byte data is delivered, following the permission signal, to the CPU 142.

The CPU 142 in step S561 determines "YES" when a permission signal is sent back from the memory control circuit 126, and records subsequently-input 1-byte data onto the memory card 148. Thereafter, in steps S565 and S567 the file pointer FP and count value S are updated. That is, the file pointer HP address data is incremented and the count value S is decremented. In step S569 the count value S is compared with "0". If S>0, the process returns to step S561. As a result, the process of steps S561–S569 is repeated until all the corresponding data to the current mail read number $R_N$ has been recorded to the memory card 148.

If count value S become "0", the CPU 142 determines that the corresponding data to the current mail read number $R_N$ has been read out, and in step S571 decrements the count value m. The count value m is incremented by an instruction list preparation process and decremented by this step.

The CPU 142 thereafter in step S573 decrements the mail read no. $R_N$, and in step S575 compares the current mail read no. $R_N$ with "L−1". If $R_N$≦L−1, the process directly advances to step S579. However, if $R_N$>L−1, in step S577 the mail read no. $R_N$ is reset and then the process advances to step S579. As a result, the mail read no. $R_N$ is also updated in a cyclical fashion. In step S579, the count value m is compared with "L−1". Because the count value m in usual cases does not exceed "L−1", the CPU 142 in this step determines "NO" and then the process returns to step S553. As a result, the process of the steps S553–S579 is repeated, whereby the data stored in the SDRAM 128 header area, thumbnail image area and original image area is sequentially recorded onto the memory card 148. On the other hand, when the count value m should exceed "L−1", "YES" is determined in step S579 and the BG mode process is forcibly ended through an error process of step S581.

According to this embodiment, the CPU is mounted with multitask OS so that writing to the SDRAM can be implemented simultaneously with recording onto the memory card. This reduces a time of between taking a subject image due to shutter button operation and recording corresponding image data into the memory card. In other words, it is possible to reduce the time interval of shutter button operations during successive shots, i.e. picture-taking interval.

Also, original compressed data, thumbnail compressed data and header data are cyclically written respectively into the SDRAM original image area, thumbnail image area and header area. If an amount of data not completed of recording exceeds predetermined value, the write process will be suspended. The write process is resumed when a vacant capacity is secured by a record process. Due to this, there is no possibility of causing breakdown in accessing the SDRAM.

Furthermore, the memory card remaining capacity can be determined based on an amount of data to be obtained by taking one picture. That is, the remaining capacity can be determined without the necessity of actually accessing the memory card. This can reduce the time required to detect a remaining capacity.

Furthermore, it is possible to skip over such processes as successively-shotable number determination, AF control and AE control that are to be made during half pressing depending upon timing of fully pressing the shutter button. This can reduce a time required to record, onto the memory card, a subject image taken due to full pressing in a present time.

Figure 26:
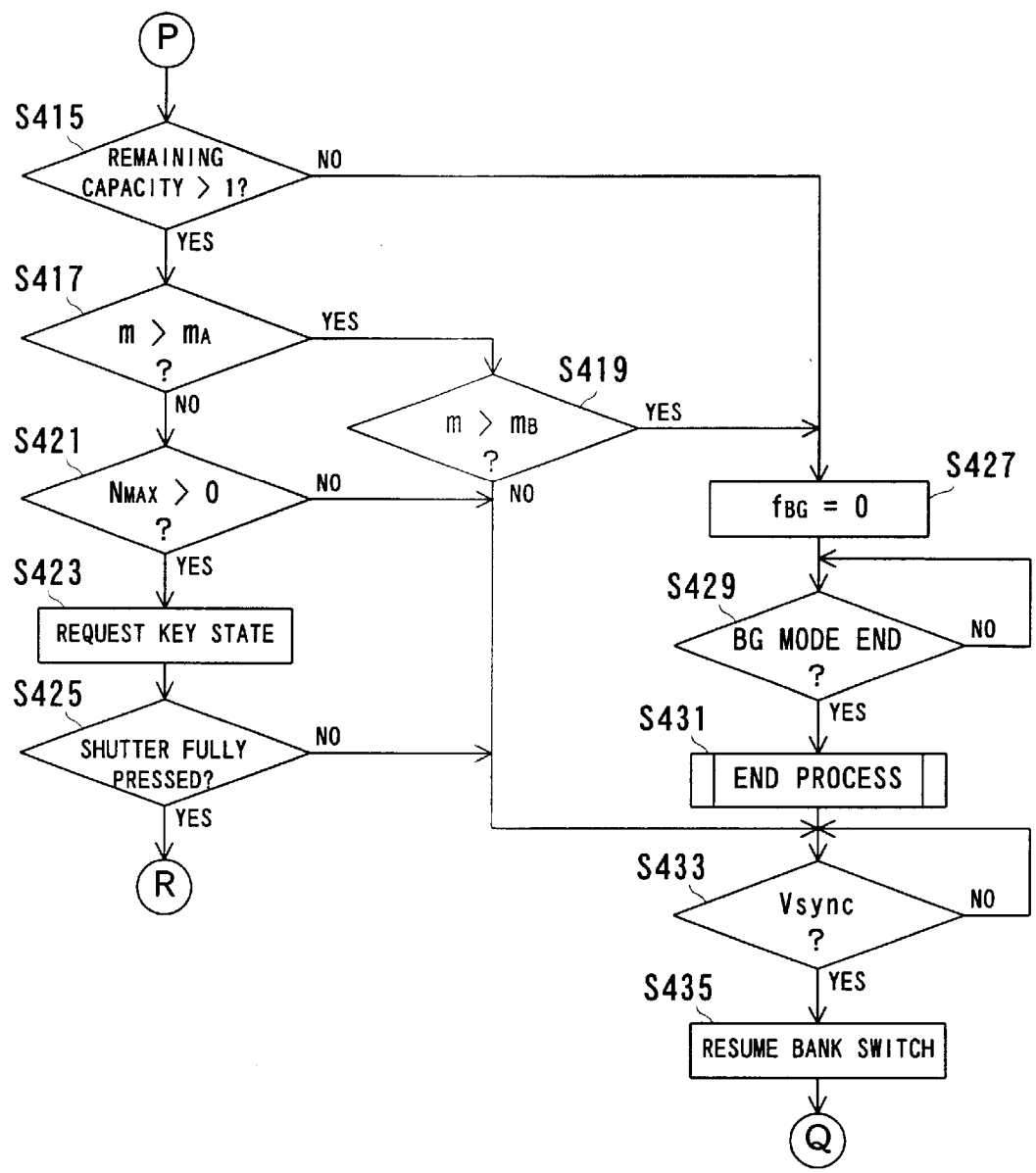
FIG. 26 is a flowchart showing still another part of the operation of the FIG. 17 embodiment.
Figure 27:
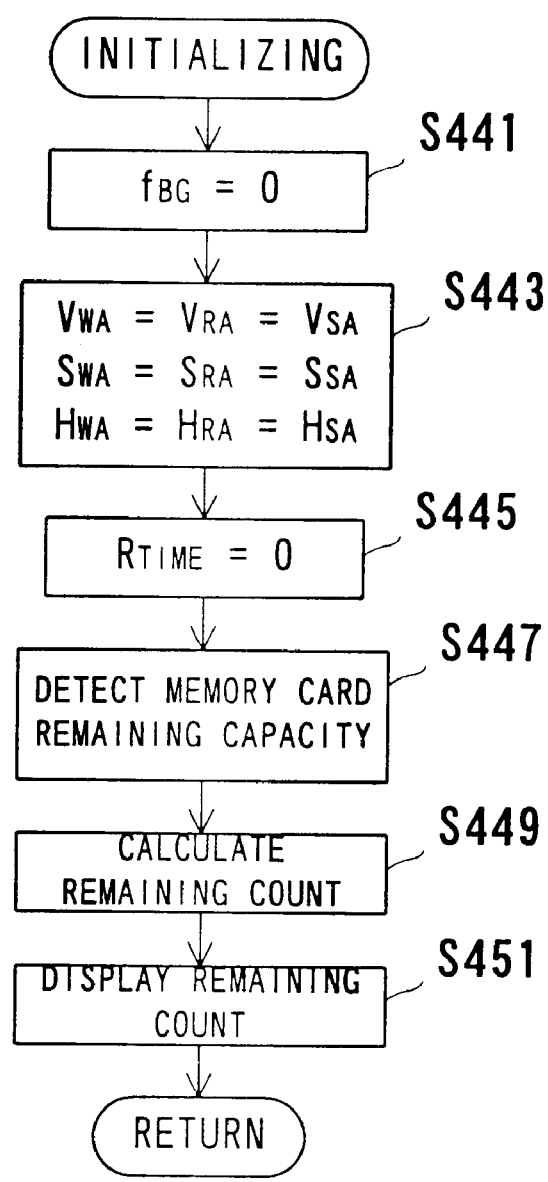
FIG. 27 is a flowchart showing yet another part of the operation of the FIG. 17 embodiment.

Incidentally, in this embodiment it is determined from a count value m whether to suspend a write process or not, as will be understood from FIG. 26. That is, when the count value m exceeds a predetermined value, the write process is suspended until the BG mode has been ended or until a vertical synchronizing signal has been inputted. Such a determination technique is applicable also to a case of shooting motion images constituted by a plurality of still images.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motion image recording apparatus for recording onto a recording medium via an internal memory a plurality of frames compressed of image data which forms a motion image and is obtained at a predetermined frame rate comprising:

an image writer for cyclically writing said compressed image data to said internal memory;

an image reader for cyclically reading out from said internal memory said compressed image data; at a lower speed than a writing speed of said image writer;

a first disabler for disabling said image reader depending upon an access situation of said image writer to said internal memory; and a second for disabling said image writer before an image write position overtakes an image read position on said internal memory.

2. A motion image recording apparatus according to claim 1, wherein said internal memory has a plurality of image blocks, and each of said image blocks having a corresponding capacity to a predetermined number of frames of compressed image data.

3. A motion image recording apparatus according to claim 2, wherein said image writer includes a selector to cyclically select said image blocks one by one, and an image data writer to write said predetermined number of frames of compressed image data to a selected one of said image blocks by said selector.

4. A motion image recording apparatus according to claim 2, further comprising:

a plurality of block flags respectively corresponding to said plurality of image blocks;

a setter for setting corresponding one of said block flags to said image block to which writing of said predetermined number of frames of compressed image data has been completed; and a resetter for resetting corresponding one of said block flags to said image block from which reading out of said predetermined number of frames of compressed image data has been completed.

5. A motion image recording apparatus according to claim 4, wherein said image reader includes an image data reader to read said compressed image data by predetermined bytes at one time out of one of said image blocks, and a renewer to renew a read address each time reading out by said predetermined bytes has been completed; and said resetter including a detector to detect said read address, a determiner to determine a completion of reading out of said image block based on a result of detection by said detector, and a flag resetter to reset said block flag depending upon a result of determination by said determiner.

6. A motion image recording apparatus according to claim 4, wherein said second disabler disables said image writer depending upon a state of said block flag.

7. A motion image recording apparatus according to claim 1, further comprising:

an imaging device for imaging a subject at said predetermined frame rate and producing a plurality of frames of image data; and a compressor for compressing said plurality of image data outputted from said imaging device.

8. A motion image recording apparatus according to claim 1, further comprising: a sound writer for cyclically writing sound data related to said compressed image data into said internal memory; and a sound reader for cyclically reading from said internal memory said sound data to be recorded onto said recording medium.

9. A digital camera, comprising:

an imaging device for imaging a subject;

a processor which is installed with a multitask OS and records into a recording medium an image signal corresponding to the subject imaged by said imaging device wherein a plurality of tasks executed by said processor in parallel with each other include a first task for writing the image signal into an internal memory and a second task for recording into said recording medium the image signal stored in said internal memory, and said second task includes a transfer suspension process to suspend a transfer of the image signal to said recording medium depending upon an access situation of said first task to said internal memory.

10. A digital camera according to claim 9, wherein said first task includes a preparation process to prepare a management table for managing address information of the image signal stored in said internal memory, and said second task including an image read process to read the image signal from said internal memory based on said management table.

11. A digital camera according to claim 10, wherein said first task further includes an estimation process to estimate based on said management table a signal amount of the image signal written in said internal memory but not yet subjected to said second task, and a write suspension process to suspend a writing of the image signal depending upon a result of estimation by said estimation process.

12. A digital camera according to claim 11, wherein said estimation process includes a first comparison process to compare said signal amount with a first numerical value, and asecond comparison process to compare said signal amount with a second numerical value greater than said first predetermined value, and said write suspension process including a first suspension process to suspend the writing of the image signal until a timing signal is generated when said signal amount exceeds said first numerical value, and a second suspension process to suspend the writing of the image signal until said second task is ended when said signal amount exceeds said second numerical value.

13. A digital camera according to claim 10, further comprising an input key to input a shooting instruction and a shooting preparation instruction, wherein said shooting preparation instruction being inputted when said input key is shifted to a first operation state, and said shooting instruction being inputted when said input key is shifted to a second operation state through said first state.

14. A digital camera according to claim 13, wherein said first task includes a first determining process to determine a presence or absence of said shooting instruction, an image write process to write the image signal into said internal memory when determined as a presence of said shooting instruction, a second determination process to determine a presence or absence of said shooting preparation instruction, a shooting preparation process to prepare for shooting said subject when determined as a presence of said shooting preparation instruction, and a second process to disable said second determination process depending upon a time difference between a determination in a last time of a presence of said shooting instruction and a determination in a present time of a presence of said shooting instruction.

15. A digital camera according to claim 14, wherein said shooting preparation process includes an adjustment process on a shooting condition and a detection process to detect a successive shot-able number.

16. A digital camera according to claim 9, wherein said recording medium is capable of being loaded and unloaded.

17. A digital camera according to claim 9, further comprising a compressor for compressing a subject image signal outputted from said imaging device, wherein the image signal written into said internal memory is a compressed image signal generated by said compressor.

* * * * *

(12) EX PARTE REEXAMINATION CERTIFICATE (7592nd)
United States Patent
Kaku

(10) Number: US 6,697,568 C1
(45) Certificate Issued: Jul. 6, 2010

(54) MOTION IMAGE RECORDING APPARATUS AND DIGITAL CAMERA

(75) Inventor: Junya Kaku, Itami (JP)

(73) Assignee: Sanyo Electric Co., Ltd., Moriguchi-shi, Osaka (JP)

Reexamination Request:
No. 90/009,595, Nov. 12, 2009

Reexamination Certificate for:
Patent No.: 6,697,568
Issued: Feb. 24, 2004
Appl. No.: 09/498,648
Filed: Feb. 7, 2000

(30) Foreign Application Priority Data

Feb. 8, 1999 (JP) .......................................... 11030507
Feb. 17, 2009 (JP) ......................................... 11038044

(51) Int. Cl.
*H04N 9/804* (2006.01)
*H04N 1/21* (2006.01)
*H04N 5/907* (2006.01)

(52) U.S. Cl. ................... 386/117; 348/231.99; 386/120; 386/124; 386/E5.067; 386/E9.013

(58) Field of Classification Search ........................ None
See application file for complete search history.

(56) References Cited

FOREIGN PATENT DOCUMENTS

| | | |
|---|---|---|
| JP | 63-064485 | 3/1988 |
| JP | 63-284987 | 11/1988 |
| JP | 03-506111 | 12/1991 |
| JP | 05-161107 | 6/1993 |
| JP | 06-090423 | 3/1994 |
| JP | 07-099628 | 4/1995 |
| JP | 09-121270 | 5/1997 |
| JP | 09-331501 | 12/1997 |
| JP | 10-136307 | 5/1998 |
| JP | 10-276402 | 10/1998 |
| WO | WO 90-13964 | 11/1990 |

OTHER PUBLICATIONS

Decision to the Opposition, issued on Nov. 4, 2005, with partial translation.

*Primary Examiner*—Christina Y Leung

(57) ABSTRACT

A motion image recording apparatus includes a shutter button. When the shutter button is pressed, still image data in frames due to picture taking is subjected to compression by a JPEG CODEC. The compressed image data is written to an SDRAM that operates as a ring buffer. The compressed image data is read out of the SDRAM concurrently with such writing, and then recorded onto a memory card. As a result, long-time motion images are recorded on the memory card. However, the read rate from the SDRAM is slower than the write rate onto the SDRAM. Accordingly, the writing is suspended when a write position approaches a read position and they becomes a predetermined relationship.

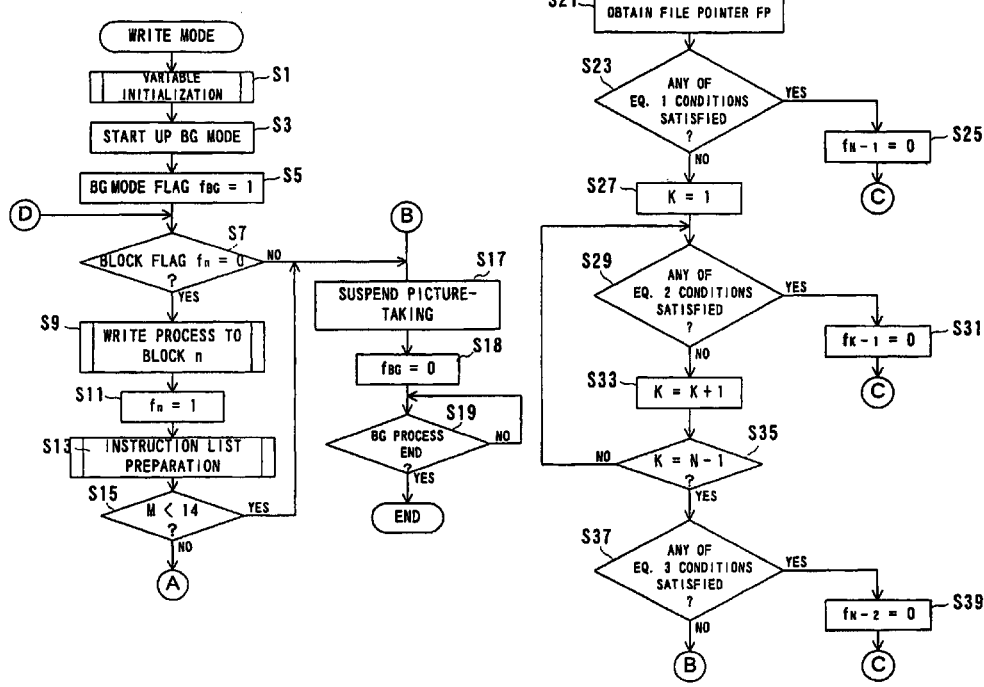

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-17 is confirmed.

* * * * *